US012323896B2

(12) United States Patent
Mendiola

(10) Patent No.: US 12,323,896 B2
(45) Date of Patent: Jun. 3, 2025

(54) DEVICE, SYSTEM AND METHOD FOR FACILITATING INTERNET ACCESS

(71) Applicant: VOXP PTE. LTD., Singapore (SG)

(72) Inventor: Dennis Beltran Mendiola, Ventura, CA (US)

(73) Assignee: VOXP PTE. LTD., Singapore (SG)

( * ) Notice: Subject to any disclaimer, the term of this patent is extended or adjusted under 35 U.S.C. 154(b) by 536 days.

(21) Appl. No.: 17/765,272

(22) PCT Filed: Sep. 30, 2019

(86) PCT No.: PCT/SG2019/050495
§ 371 (c)(1),
(2) Date: Mar. 30, 2022

(87) PCT Pub. No.: WO2021/066737
PCT Pub. Date: Apr. 8, 2021

(65) Prior Publication Data
US 2022/0345974 A1 Oct. 27, 2022

(51) Int. Cl.
*H04W 40/02* (2009.01)
*H04W 28/082* (2023.01)
*H04W 88/10* (2009.01)

(52) U.S. Cl.
CPC ......... *H04W 40/02* (2013.01); *H04W 28/082* (2023.05); *H04W 88/10* (2013.01)

(58) Field of Classification Search
CPC ... H04W 40/02; H04W 28/082; H04W 88/10; H04W 52/245; H04W 84/12;
(Continued)

(56) References Cited

U.S. PATENT DOCUMENTS 10,057,882 B1 * 8/2018 Delker .................... H04W 4/60
10,368,281 B2 * 7/2019 Ganesan ............. H04W 36/302
(Continued)

FOREIGN PATENT DOCUMENTS

KR    1020150006929 A    1/2015

OTHER PUBLICATIONS

Cavalcanti, Dave, et al. "Issues in integrating cellular networks WLANs, and MANETs: a futuristic heterogeneous wireless network." IEEE Wireless communications 12.3 (2005): 30-41. (Year: 2005).*

(Continued)

*Primary Examiner* — Sharad Rampuria
(74) *Attorney, Agent, or Firm* — JCIP; Joseph G. Chu

(57) ABSTRACT

A device and method for facilitating network access is disclosed. The device for facilitating network access comprises: a first communication module operable to obtain the network access from a first network provider; a second communication module operable to connect to a communication device, the communication device is operable to obtain the network access from a second network provider; and a processor operable to select at least one of the first communication module and the second communication module to connect to an electronic device; wherein the processor is operable to select the at least one of the first communication module and the second communication module based on a property of a set of executable instructions capable of being accessed by the electronic device.

25 Claims, 4 Drawing Sheets

(58) Field of Classification Search
CPC .. H04W 72/541; H04W 84/18; H04N 21/631; H04N 21/437; H04N 21/45
See application file for complete search history.

(56) References Cited

U.S. PATENT DOCUMENTS

| | | | |
|---|---|---|---|
| 10,542,466 B1* | 1/2020 | Indurkar | H04W 36/0038 |
| 2013/0235814 A1 | 9/2013 | Wietfeldt et al. | |
| 2015/0282040 A1* | 10/2015 | Daniel | H04W 40/02 370/329 |
| 2016/0315688 A1 | 10/2016 | Bhargava et al. | |
| 2020/0059839 A1* | 2/2020 | Zhou | H04M 7/006 |

OTHER PUBLICATIONS

International Search Report dated Nov. 11, 2019 and Written Opinion of International Searching Authority dated Nov. 11, 2019 for International Application No. PCT/SG2019/050495.

* cited by examiner

DEVICE, SYSTEM AND METHOD FOR FACILITATING INTERNET ACCESS

FIELD OF INVENTION

The present invention relates to a device, system and method for facilitating network, e.g. Internet, access.

BACKGROUND

The following discussion of the background to the invention is intended to facilitate an understanding of the present invention only. It may be appreciated that the discussion is not an acknowledgement or admission that any of the material referred to was published, known or part of the common general knowledge of the person skilled in the art in any jurisdiction at the priority date of the invention.

National backhaul, oftentimes referred to as a National Broadband Network, is an extensive network infrastructure typically supported by a governmental organization that allows telecommunications service providers (telcos) and Internet service providers (ISPs) to connect onto/into.

In countries or areas without national backhaul, such as rural or underdeveloped areas, ISPs and Telcos often face a myriad of infrastructure constraints. As a result, different ISPs and Telcos are required to build their own infrastructure. Such infrastructure may be alternately referred to as copper and/or fiber backhaul.

In addition, telecommunications service providers and ISPs may not be able to pivot far beyond legacy telecommunications design. The hardware, whether based on fiber, copper, or radio access network, have largely been designed for dated communications protocols such as synchronous voice communications. Existing infrastructure is thus incapable of supporting massive asynchronous data delivery of the type that can support the ever-increasing demand for bandwidth. The inadequate infrastructure and support result in bad or unreliable connection. Apart from the backhaul problem, network service providers find it relatively difficult to justify providing network infrastructure (i.e. the "pulling of copper or fibre" to areas with a population of, for example, less than 500 people) as the provision of such network infrastructure may not make economical sense or provide desired returns on investment (ROI). In particular, switching to a data-centric network infrastructure to cater to relatively low disposable income communities and providing fibre backhaul, is an expensive proposition for telcos. As an alternative, the network service providers opt to erect massive communication towers to cover the underserved using relatively expensive 3G/LTE. However, there exists a gross market mismatch, which includes the provision of relatively expensive Internet access to people who cannot afford it in the first place. Even then, such massive communication towers may not be able to provide the desired level of network performance.

In light of the aforementioned problems, there exists a need to alleviate the mismatch and provide a relatively cost-efficient and yet reliable network solution to the un-networked or underserved.

SUMMARY OF DISCLOSURE

The above need is at least partly met by apparatus and methods according to the appended claims.

According to a first aspect, an apparatus comprises a first and second module. The first module is operable to obtain network access via a first wireless path using a first radio access technology. The second module is operable to communicate, via a second radio access technology with at least one disparate apparatus that is operable to obtain network access via a second wireless path. The second module is further operable to provide the network access via the first and/or via the second wireless path to at least one user terminal via the second radio access technology. It is noted that the term network access may refer to e.g. Internet access.

In some examples, the first radio access technology is a cellular technology. For example, the first module may obtain network access via the first radio access technology (e.g., LTE, LTE advanced, 3G, etc.) and provide the network access to user terminals in the vicinity via the second access technology (e.g., via a wireless local access technology, such as WiFi, Bluetooth, etc.). However, the network access via the first radio access technology provided by the first module may be congested by too many user terminals, or it may not be satisfying per se for one or more user terminals (e.g. in case of 3G for user terminals requesting a video stream). This is alleviated by the second module being further adapted to provide network access via the second radio access technology by means of connecting to a disparate apparatus, that is otherwise similar to the apparatus. The disparate apparatus may be able to provide network access (e.g. via LTE, LTE advanced, 3G, etc.) without being congested by too many user terminals, such that it may offer increased bandwidth and/or data-rate. Possibly, the disparate apparatus may per se be able to provide better network access (e.g. in case it offers LTE and the apparatus only offers 3G). Hence, by providing, at least partly, network access to the user terminal via the second access technology by means of connecting to a disparate apparatus, the network access offered to the user terminal may be improved, and the available capacities for network access may be used in a more optimal fashion. This provides a particularly useful, and low-cost solution, especially for underserved regions. For example, a user terminal served by an apparatus only offering 3G connectivity on its first module may, in case it requests a video stream and/or other data, receive part of the video stream and/or other data, via the second path, particularly if the disparate apparatus offers a higher speed access, e.g. via LTE.

Notably, the first radio access technology may be one of: 3G, LTE and/or advanced LTE and/or 5G. Also, the first module may support two, three or more of the aforementioned technologies and may be a combined LTE/3G module, for example. Hence, the apparatus may be flexibly deployed and use 3G and/or LTE etc., depending or upon the availability of the respective radio access technology at the site of installation. On the second wireless path, the first radio access technology may be used, or a different cellular radio access technology may be used. Possibly the network access may also be provided indirectly on the second wireless path, e.g., via the second radio access technology and a corresponding connection to another disparate apparatus that is operable to obtain network access.

The second radio access technology may be a wireless local access technology, such as WiFi, Bluetooth, etc. Particularly, a wireless local access technology may be used at a frequency below 1 GHz, such as at one or more sub-GHz bands, e.g. at 700 MHz, 850 MHz, and/or 990 MHz. This may be particularly advantageous for installing the apparatus in, at or on a building, such as to serve user terminals within the building.

Notably, deploying a plurality of apparatus according to the present disclosure, these may be adapted to form a mesh network, and traffic as requested by user terminals served by the various apparatus may effectively be offloaded and/or distributed via the mesh network, i.e. not only to a single disparate apparatus, but also to two more apparatus.

The apparatus may comprise a control unit operable to allocate a first data rate and/or a second data rate to the at least one user terminal for network access via the first and second wireless paths, respectively. Additionally or alternatively, the control unit may be operable to allocate a first bandwidth and/or a second bandwidth to the at least one user terminal for network access via the first and second wireless paths, respectively. Hence, the apparatus serving the respective user terminal may control the amount and/or rate of data communicated via the first and second wireless paths, respectively.

The control unit may be adapted to allocate the first and second data rates, and/or the first and second bandwidths, at least in part based on the first radio access technology and/or a second radio access technology available on the second wireless path. For example, the allocation may be based at least in part on a transmission speed, data rate, bandwidth, packet capacity, latency etc. offered by the first and second paths, respectively.

Additionally or alternatively, the control unit may be adapted to allocate the first and second data rates, and/or the first and second bandwidths, at least in part based on a congestion level of the first path via the first radio access technology and/or a congestion level of the second path via the second radio access technology. A congestion level may correspond to a number of user terminals served by the respective apparatus ultimately providing network access via its respective first module.

The control unit may be adapted to allocate the first and second data rates, and/or the first and second bandwidths, at least in part based on a data rate and/or a bandwidth requested by the at least one user terminal. For example, the allocated data rates and/or bandwidths may be proportional to the bandwidth requested by the user terminal. Notably, the term "request" refers to direct requests by the user terminal but also indirect requests, e.g. a bandwidth or data rate required to meet the data transfer requested by the user.

The determination whether to provide network access via the first and/or via second wireless paths may include load balancing, e.g. on the network layer. For example, AI and machine learning techniques may be implemented on the apparatus to better determine how to load balance internet sources, e.g. via the first and/or via the second wireless path.

The apparatus may be adapted to form a mesh network with the at least one disparate apparatus. This may allow sharing the network access offered by the various apparatus amongst the user terminals and thus optimize throughput.

The apparatus may be adapted to retrieve data requested by the at least one user terminal from the mesh network. For example, a video request by a user terminal may already have been requested by this or another user terminal such that the video may at least partly be available in the mesh network. By retrieving the video at least partly from the mesh network, scarce network access resources may be saved.

The apparatus may be adapted to retrieve data requested by the at least one user terminal from a cache of the apparatus and/or a cache of the at least one disparate apparatus. This way, data may efficiently be retrieved by the user terminals without having the need for excessive use of the scarce network access resources. For example, edge-caching may be used, e.g. on NAS or removable storage device(s) of the apparatus. As a further example, AI and machine learning aspects may be used to determine which data (e.g. media content) shall be stored or cached on which apparatus. This way, the use of storage space and/or the access speed to certain data may be optimized.

Overall, using a mesh as described herein may allow to minimize the demand for scarce network access resources while at the same time effectively providing rapid data access. For example, using peer-to-peer techniques as described herein may allow a decrease in overall bandwidth demand, the more apparatus are deployed in a mesh network.

The apparatus may comprise means for transmitting a compensation, in particular a digital currency, credit and/or token, to the disparate apparatus, if network access is provided via the second wireless path. This way, the disparate apparatus may be incentivized to share its network access with the apparatus. Hence, network throughput may be increased in a particularly simple way. No banks, network providers and/or other intermediaries need to be necessarily involved.

The apparatus may be adapted such that the compensation is selected at least in part based on a property of the network access via the second wireless path, in particular a time, a period and/or a data rate of the network access. Thus, the disparate apparatus may obtain a fair return for sharing the network access.

The control unit may be adapted to alter a frequency channel and/or a transmission power used by the second module at least in part based on an interference level caused by licensed and/or unlicensed use of the frequency channel. For example, if interference with licensed use of the frequency channel is at hand (e.g., caused by devices operating in a GSM band of a network operator), the frequency channel may be altered to a channel that is used less. Additionally or alternatively, the transmission power may be lowered (e.g., to give priority to the licensed use). Similarly, if interference with unlicensed use of the frequency channel is at hand (e.g., caused by illegal devices, or noise sources, such as microwave ovens), the frequency channel may be altered to a channel that has less interference. Additionally or alternatively, however, in this case, the transmission power may be increased.

The control unit may be adapted to track the amount of data sourced from the network access via the first and/or via the second wireless path on a per user terminal basis. Thus, the network operators may be provided with corresponding data for billing purposes on a per user terminal basis. This may facilitate handling of mesh networks described herein. For example, each apparatus may report to the corresponding network operators, how much data was consumed by user terminals connected to it, regardless of whether the data was sourced by the apparatus itself (e.g., via the first module) or shared by other apparatus (e.g., via the second module). For example, the control unit may generate a dynamic (e.g., alphanumeric) ID for each user terminal to this end. Based on the ID, the data consumption may be tracked. Moreover, the ID may simultaneously be used to track to amount of data shared with others by a user terminal. Hence, the compensation as described herein may also be based on the ID. For example, a compensation may be associated with an ID.

Another aspect relates to an apparatus comprising a first module and a second module. The first module may be operable to obtain network access via a first wireless path using a first radio access technology. The second module may be operable to communicate, via a second radio access technology, with at least one disparate apparatus. The second module may further be operable to provide the network access to the disparate apparatus via the first wireless path. The apparatus described in this paragraph may essentially correspond to the disparate apparatus described further above, and vice versa. Both variants may be embodied in one and the same physical apparatus.

The first and second radio access technologies may be as outlined above. For example, the first radio access technology may be one of: 3G, LTE and/or advanced LTE and/or 5G. The second radio access technology may be a wireless local access technology, such as WiFi, Bluetooth, etc. Particularly, a wireless local access technology may be used at a frequency below 1 GHz.

The apparatus may comprise a control unit operable to allocate a data rate and/or a bandwidth for network access by the disparate apparatus. In other words, the apparatus may decide "how much" of its network access is provided to the disparate apparatus.

The control unit may be adapted to allocate the data rate at least in part based on the first radio access technology and/or a congestion level of the first path via the first radio access technology. For example, the allocation may be based at least in part on a transmission speed, data rate, bandwidth, packet capacity, latency etc. offered by the first and second paths, respectively.

Additionally or alternatively, the control unit may be adapted to allocate the bandwidth at least in part based on a congestion level of the first path via the first radio access technology. A congestion level may correspond to a number of user terminals served by the apparatus via its first module.

The control unit may further be adapted to allocate the data rate, and/or the bandwidth, at least in part based on a data rate and/or a bandwidth requested by the disparate apparatus. For example, it may be proportional to the data rate and/or bandwidth requested.

The apparatus may comprise means for receiving a compensation, in particular a digital currency, credit and/or token, if the network access is provided to the disparate apparatus. The compensation may be selected at least in part based on a property of the network access, in particular a time, a period and/or a data rate of the network access.

A further aspect relates to a system comprising two or more of the above-mentioned apparatus. Hence, a mesh network may be provided that optimizes network access for user terminals.

The system, e.g., the two or more apparatus may be installed in a building. For example, an apparatus may be provided at a relatively lower floor level (e.g. level one, two, three, four, five, six, seven or eight) such that it provides good connection via 3G/LTE (as 3G/LTE antennas are typically oriented downwards). One or more further apparatus may be provided at higher levels and, if need be, they may offload traffic to apparatus at a relatively lower level that may offer better network access. Hence, network access may be efficiently provided to user terminals at these floor levels.

The apparatus described herein may be implemented as a router and/or modem. Notably, the apparatus may also comprise a third module (additionally or alternatively to the first module). The third module may be adapted to provide network access via a broadband access technology (e.g. fixed line, such as DSL, and/or wireless such as microwave). Network access provided by the third module may be shared in the same manner as described above with regard to the network access provided by the first module. The aspects described herein with regarding to load balancing between network access provided by the first and second wireless paths are applicable also to a load balancing between network access provided by the third module and the second wireless path, and also between network access provided by the third module and the first and second wireless paths. Particularly, the possibility of sharing network access by the third module via the second radio access technology may foster deployment of broadband access technology, since the bandwidth provided by the broadband access technology and the associated costs may be easily shared, e.g., as described in detail herein.

A further aspect relates to a method. The method may comprise the step of receiving, at an apparatus, a request for network access from one or more user terminals using a second wireless access technology. The method may comprise the further step of determining (e.g., by the apparatus) to provide a first portion of the network access by using a first wireless path, from the apparatus to a radio access network, using a first wireless access technology. The method may comprise the further step of determining (e.g., by the apparatus) to provide a second portion of the network access by using a second wireless path, from the apparatus to a disparate apparatus, using the second wireless access technology.

In other words, the second portion of the network access may be provided by the disparate apparatus (e.g. using the first or a disparate radio access technology) and shared with the user terminal via a connection with the apparatus via the second radio access technology. It is noted that the term "portion of network access" may correspond, e.g. to a portion of a bandwidth requested by the user terminal, and/or a data rate requested by the user terminal, an amount of data requested by the user terminal etc. First and second portions may add up to the amount as requested by the user terminal. However, they may also be smaller than the amount requested.

A further aspect is directed to a related method. The method comprises the step of receiving, at an apparatus, a request for network access from one or more disparate apparatus using a second wireless access technology. It further comprises the step of determining (e.g., by the apparatus) to provide the network access by using a wireless path, from the apparatus to a radio access network, using a first wireless access technology.

In other words, the apparatus may decide whether or not to share its network access with user terminals served by other apparatus. The apparatus may decide to grant network access as requested, or limited to a portion of a bandwidth requested by the user terminal, and/or a data rate requested by the user terminal, an amount of data requested by the user terminal etc.

A further aspect relates to a method for providing network access to one or more user terminals in a building. The method may comprise installing at least one apparatus in, at, and/or on the building in particular at one or more floor levels six or higher.

Notably, the methods and apparatus described herein may be combined with features and/or steps described with respect to other apparatus and methods as described herein, even though not every combination may be expressly mentioned.

Advantages of the present disclosure are the provision of a reliable network solution which is affordable to the general public of an unreached region. This is in line with the overall goal of providing affordable Internet access for all using or utilizing legacy infrastructure without the need to spend large amounts of resources (financial or otherwise) on an infrastructure overhaul.

An aspect of the invention enables to provide relatively low-cost Internet access (with reliable connectivity) at the final leg of the telecommunications network that delivers telecommunication services to end-users (customers). The final leg is often referred to as the last mile or last kilometre. In particular, the invention seeks to provide network coverage to more end-users with minimal incremental capital expenditure for the last mile and to deliver longer range and deeper penetration connectivity.

An apparatus as described herein (e.g. a network device), such as a router, is contemplated in a manner so as to provide reliable Internet access/connection or network service to end-users. The network device may include a plurality of communication modules, with each communication module configured for direct connection to a network provider and/or for connection to other network devices or user devices (i.e. user terminals). A control unit (e.g. implemented by a processor) is operable to activate one or more of the communication modules to provide optimal and reliable connectivity for an end-user, with an added benefit to the reduction of speed bottleneck in network or Internet access. The network device is especially suited for deployment as a cost-effective 'last mile' solution. The processor may easily be programmed to include artificial intelligence modules to achieve the optimal and reliable connectivity.

In some embodiments, the plurality of communication modules may each be configured to operate at a specific bandwidth.

The apparatus, e.g., network device, can be in the form of an intelligent router, which is highly adapted to serve emerging markets, so as to provide digital/Internet/network access and service to the relatively unreached.

In an aspect, the apparatus, e.g., network device, addresses an increasing need around the world for reliable connectivity. It proceeds from the realities of privately-operated telco infrastructure—e.g., the default national backhaul in the Philippines—correcting innate inefficiencies by decentralizing bandwidth provision and enlisting the crowd/subscribers in redistributing connectivity to more users. Coupled with artificial intelligence (AI) and Internet-of-things (IoT) technology, the intelligent router may be utilized as a central intelligent device in a premise; that which goes beyond giving reliable Internet access to user terminals (e.g. smartphones, tablets, desktop computers, and set-top boxes). In particular, the intelligent router is envisaged to become a central IoT device for connectivity, and potentially for energy, security, safety, entertainment and general conveniences that will translate to a higher quality of life.

Throughout the specification, unless the context requires otherwise, the word "comprise" or its variations such as "comprises" or "comprising," will be understood to imply the inclusion of a stated integer or group of integers but not the exclusion of any other integer or group of integers.

Furthermore, throughout the specification, unless the context requires otherwise, the word "include" or its variations such as "includes" or "including," will be understood to imply the inclusion of a stated integer or group of integers but not the exclusion of any other integer or group of integers.

Aspects of the invention or disclosure seek to provide an effective solution to provide at least the following:
1. To provide a system, method and device for provisioning Internet access, particularly Internet service, with the objective of providing coverage to more subscribers with minimal incremental "last mile" capital expenditure (CAPEX);
2. To deliver longer range and deeper penetration connectivity, in both rural and urban environments;
3. To offer better indoor coverage using WiFi offloading techniques without necessarily investing in hardware infrastructure such as copper and fiber;
4. To maximize network utilization through a combination of dynamic pricing of plans and edge computing/caching;
5. To deliver better, smoother, such as buffer-free video streaming, using machine learning, content filtering, and advanced traffic shaping techniques.

An aspect of the invention relates to an apparatus, which can be a networking device such as a WiFi router and/or a modem that seeks to overcome several limitations and obstacles in offering relatively affordable mobile Internet (3G/LTE). The device is suitable for use with a legacy telecommunications device or network for enhancing reachability to unreached or underserved areas. Such unreached or underserved areas may include rural or underdeveloped areas.

In some embodiments, the apparatus is a WiFi modem. The WiFi modem may include at least the following features:
a. Combining mesh networking technology and high power radios outfitted with larger antennas, and with higher decibels relative to isotropic (dBi) radiator, ideally running on sub-giga bands (e.g. provided by the second module as described herein);
b. Minimizing radio interference that could be caused (e.g. by the second module) with the telco's mobile radio (last mile) (e.g. when communicating with the first module as described herein);
c. Leveraging of open source technology, modularized manufacturing practices, and technical standards, for example, IEEE standards (or widely adopted communication standards), thereby lowering the costs of manufacture, and post-sales support; maximizing flexibility in delivering ever expanding features;
d. Adopting best practices developed in delivering bite-sized Internet via a dedicated program running on the routers, network appliances, and the like capable of using traffic shaping, content filtering, and machine learning techniques.

According to an aspect, the device comprises a first communication module and a second communication module. The first communication module is operable to obtain Internet access from a network provider, and the second communication module is operable to connect to a communication device, the communication device operable to obtain Internet access from either the network provider, another network provider, or via another communication device. A processor is operable to determine the activation of at least one of the first communication module and the second communication module to connect to an electronic device and/or the network provider, based on a property of a set of executable instructions capable of being accessed by the electronic device.

In this manner, the electronic device is operable to obtain Internet access based on the property of a set of executable instructions, thereby speed bottleneck in the Internet access can be reduced and the connection in a last mile network service to a user can be improved.

In some embodiments, the second communication module is operable to connect to the communication device through a mesh network to obtain Internet access from one or more network providers.

In some embodiments, where Internet access can be obtained from two network providers, a speed of the Internet access obtained from a second network provider is slower than the speed of the Internet access obtained from a first network provider where the electronic device is in an active mode, and the speed of the Internet access obtained from the second network provider is faster than the speed of the Internet access obtained from the first network provider where the electronic device is in an inactive mode.

In some embodiments, the processor is further operable to select at least one of the first communication module and the second communication module based on the status of the first network provider and/or the second network provider.

In some embodiments, the status includes at least one of a network traffic of the first network provider and/or the second network provider and a number of connections to the first network provider and/or the second network provider.

In some embodiments, the property of the set of executable instructions includes at least one of the following: speed, packet capacity and latency tolerance of the set of executable instructions.

In some embodiments, the device further comprises a third communication module operable to obtain the Internet access from a fixed broadband means.

In some embodiments, the third communication module is operable to connect to the communication device.

In some embodiments, the third communication module is operable to share the Internet access obtained from the fixed broadband means with the communication device through a mesh network.

In some embodiments, the processor is operable to select the third communication module if a user wishes to share the Internet access with a third party through the communication device.

In some embodiments, if the Internet access is shared with the third party through the communication device, a compensation is provided to the user; and the compensation is in the form of at least one of a digital currency, credit (or top-up) and token.

In some embodiments, the compensation is decided based on a property of a use of the third party; and the property of the use includes at least one of time, period and capacity of the Internet access shared.

In some embodiments, the fixed broadband means comprises at least one of the following: digital subscriber line (DSL), fibre and microwave.

In some embodiments, the Internet access obtained from the first network provider relates to 3G and/or LTE network.

In some embodiments, the device further comprises a fourth communication module operable to obtain Internet access through Wi-Fi™ and/or Bluetooth™ network.

In some embodiments, the device further comprises an attached network storage (NAS) operable to store downloaded content, and if the electronic device tries to access the content, a priority Internet access is provided to the electronic device to access the content stored in the NAS.

In some embodiments, the communication device comprises either a router or a modem.

In another aspect, there is a method for facilitating Internet access using a first communication module and a second communication module, comprising: obtaining, by the first communication module, the Internet access from a network provider; connecting the second communication module to a communication device; obtaining, by the communication device, Internet access from either the network provider, another network provider, or via another communication device; and selecting at least one of the first communication module and the second communication module to connect to an electronic device, based on a property of a set of executable instructions capable of being accessed by the electronic device.

BRIEF DESCRIPTION OF THE DRAWINGS

The present invention will now be described, by way of example only, with reference to the accompanying drawings, in which.

Other arrangements of the invention are possible and, consequently, the accompanying drawings are not to be understood as superseding the generality of the preceding description of the invention.

DETAILED DESCRIPTION OF EMBODIMENTS

Figure 1:
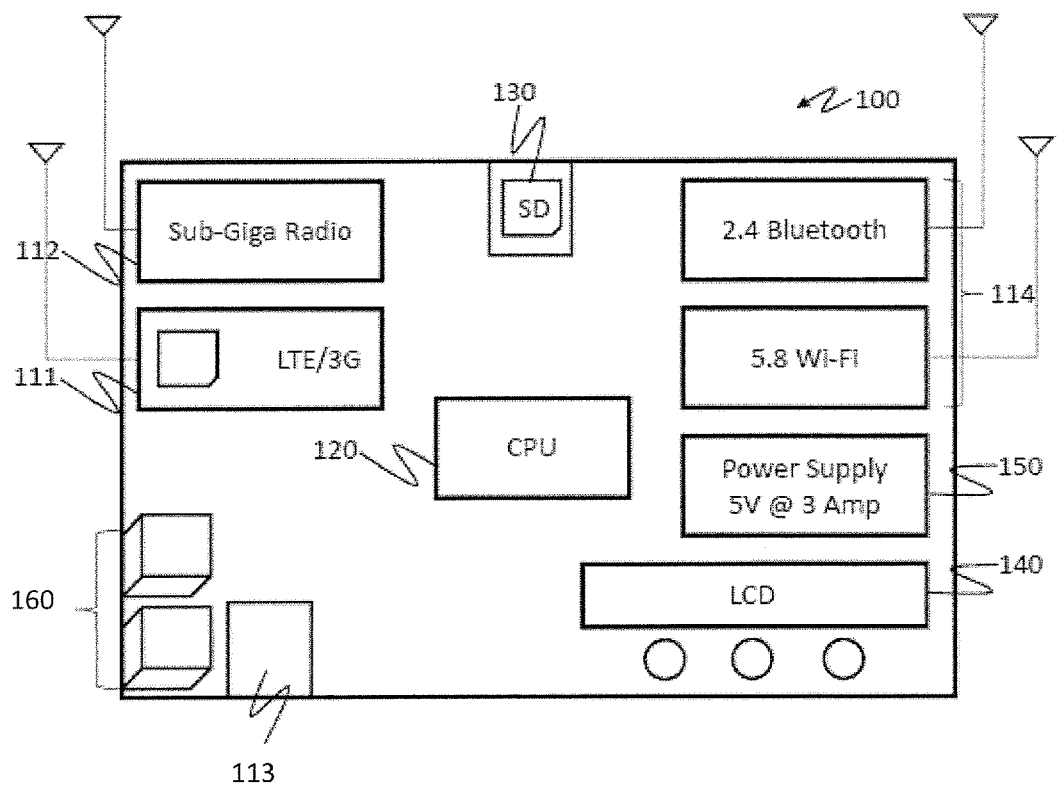
FIG. 1 and FIG. 2 are block diagrams showing a device for facilitating Internet access in accordance with some embodiments.

With reference to FIG. 1, apparatus 100 (in the following the terms apparatus and device will be used interchangeably) comprises a first module 111 and a second module 112. In the following, the terms module and communication module will be used interchangeably.

Modules 111 and 112 may be grouped to form a joint larger entity, e.g. a joint communication module.

The first communication module 111 may be referred to as a first radio set. The first communication module 111 may be regarded as a last mile connection device to an end user or the device 100 (the modem). The first communication module 111 is operable to connect to a network provider, for example a telecommunications operator or a telecommunications company, to obtain Internet access or Internet service. The device 100 may be configured to relate to the network provider. For example, the device 100 may be manufactured and/or distributed by the network provider. In another example, a user of the device 100 may be a subscriber of the network provider.

In this manner, the first communication module 111 is operable to obtain the Internet access from the first network provider. In some embodiments, the Internet access obtained from the first network provider relates to a 3G and/or LTE network. For example, the first communication module 111 may operate at selected bandwidth in 700 MHz (LTE), 1800 MHz (LTE) and/or 2100 MHz (3G).

In some embodiments, the first communication module 111 is operable to deliver Internet access to electronic devices (e.g. user terminals; not shown) and provide the Internet access obtained from the first network provider to the electronic device.

The second communication module 112 may be referred to as a second radio set. The second communication module 112 is operable to connect to a one or more user terminals (not shown) and/or one or more apparatus that may generally be similar to device 100. By connecting to one or more apparatus, the device may be operable to connect to a network provider, which may be the same network provider or a different network provider, to obtain the Internet access, albeit via a different wireless path and possibly also via a different radio access technology.

In some embodiments, the second communication module 112 is operable to connect to another device through a mesh network. In this manner, the second communication module 112 may obtain Internet access from the network provider through the other device. In some embodiments, the second communication module 112 may operate using an IEEE 802.11-based protocol for Wi-Fi™ to connect in a mesh network fashion on a contiguous 10 MHz portion of the 900 MHz ISM band (Industrial, Scientific and Medical band). For example, the second communication module 112 may operate in a region between 915 MHz and 925 MHz.

In some embodiments, the second communication module 112 is operable to connect to a user terminal and provide Internet access obtained from a network provider to the other electronic device through the communication module 112.

It is to be appreciated that when the device 100 is operating as a modem, the device enables a direct connection to the Internet (or World Wide Web), e.g. to one or more user terminals served by device 100. When the device 100 is operating as a router, the device 100 can facilitate connection of user terminals to the Internet via wireless communication protocol such as Wi-Fi, e.g. via connecting to one or more devices that are generally similar to device 100.

In some embodiments, the device 100 is able, through an intelligent 'mix-and-match' algorithm, to provide reliable and near-optimal or optimal connection between an end user device (e.g. a user terminal) and the Internet.

In some embodiments, the device 100 is envisaged to function as part of a relay comprising multiple network devices to provide Internet access at a 'last mile' connection to end users.

The device 100 in accordance with the present invention can communicate through the second communication module with other like devices, using high power radios outfitted with external antennas, on sub 1 GHz ISM frequency bands, and through a mesh networking topology. The device 100 can be programmed to overcome interference that may exist in the sub 1 GHz ISM bands. In addition, by leveraging open source technology, modularized manufacturing practices and widely adopted communication standards (for example, the IEEE 802.11 standard for WiFi™ connection), the device 100 can lower the costs of manufacture and post-sales support. Also, through the use of open source technology, the ease and speed by which features can be introduced or developed are optimized. The device 100 can adopt practices developed in delivering bite-sized network (for example, Powerapp™) using traffic shaping, content filtering and/or machine learning techniques.

As part of the joint communication module, or separately, a third module 113 may optionally be provided. The third communication module 113 may be operable to obtain Internet access from fixed broadband means, and augment Internet access that are being sourced from the first and second communication modules (111 and 112). In some embodiments, the third communication module 113 is operable to share the Internet access obtained from fixed broadband means with the other devices through a mesh network. The fixed broadband means may include, but not be limited to, at least one of the following: digital subscriber line (DSL), fibre and microwave.

Should the user wish, the processor 120 is operable to use the third communication module 113 to share Internet access with third parties and other communication devices through the mesh network running on the second communication module 112.

At least one of communication module 112 and/or 113 is configured or arranged in wired communication and/or wireless communication with electronic devices (e.g. user terminals). For example, the communication module 110, via module 112 and/or 113, transmits signals to at least one electronic device and receives signals from at least one electronic device. The signals may include, but not be limited to, audio signal, video signal, text signal, multimedia signals, or combination thereof.

The signals may also include various formats of data packet.

The electronic devices may be end-user devices and may include, but not be limited to, smartphone, desktop computer, laptop, tablet computer and wearable devices, in particular intelligent wearable devices such as smart watches, smart glasses or mobile virtual reality headset.

In some embodiments, the speed of Internet access obtained through the other network device (connected to device 100 via module 112) is faster than the speed of Internet access obtained from the first network provider where the electronic device (not shown) is in inactive mode. Or the speed of the Internet access obtained from the other network device is slower than the speed of the Internet access obtained from the first network provider where the electronic device is in active mode.

Additionally or alternatively, in some embodiments, device 100 comprises a fourth communication module 114 which may be part of the joint communication module or provided separately.

The fourth communication module 114 may be referred to as a fourth radio set. In some embodiments, the fourth communication module 114 may obtain Internet access through Wi-Fi. In others, Bluetooth™ is also enabled. For example, the fourth communication module 114 may operate at 2.4/5.8 GHz (Wi-Fi™) and Bluetooth™ (2.4 GHz). The fourth communication module 114 may have a System on a Chip (SOC) form factor.

The device 100 may comprise at least one processor 120 forming a control unit. The processor 120 may include, but not be limited to a CPU (Central Processing Unit) installed on a motherboard. An OS (Operating System) running on the CPU may include, but not be limited to an open source router-centric OS based on Linux™.

Where there are multiple network providers and/or radio paths available for establishing connections to the network/Internet, the processor 120 is operable to detect a status of each network provider and/or radio path. For example, a first network provider and a second network provider may be available, and processor 120 may select at least one of the first network provider and the second network provider to be connected to the electronic device based on the status. For example, the processor 120 is operable to select at least one of the first network provider and the second network provider, to be connected to the electronic device, based on a property of a set of executable instructions capable of being accessed by the electronic device. Similarly, the processor may select at least one of a first and second available path, e.g., based on a property of a set of executable instructions capable of being accessed by the electronic device.

In some embodiments, the property of the set of executable instructions may include at least one of the following: required speed, volume type (whether heavy or light in terms of megabyte usage, e.g., video streaming content is heavy, while online games often use light volumes of data) and latency tolerance of the set of executable instructions.

In some embodiments, the set of executable instructions capable of being accessed by the electronic device may relate to the set of executable instructions for selecting which Internet source shall be used by a particular application (also referred to as "app").

In some embodiments, the processor 120 is operable to detect the programs or apps executed in the electronic device.

For example, if a social network service application is operated in the electronic device, the processor 120 may select the first communication module 111 to deliver Internet access for that social network service app and obtain such Internet access from the first network provider and/or first path (e.g. a path which offers lower data rate). If a video streaming application is operated on the electronic device, the processor 120 may choose to use a second network provides and/or a second path (e.g. a path which offers higher data rate and/or lower latency). Depending on the properties of the Internet access offered by the first module 111, this connection may be selected. Additionally or alternatively, an Internet connection may be selected that is provided by the second module 112 via one or more other devices.

Internet access may selectively be provided for a particular video streaming application, and a corresponding module may be selected for that matter.

For example, if the social network service application and the video streaming application are concurrently operated on the electronic device, the processor 120 may select both the first communication module 111 and the second communication module 112 to deliver Internet to the electronic device. The electronic device may then obtain Internet access for operating the social network service application and the video streaming application via the first and second modules, respectively, e.g. from the first network provider and/or the second network provider. In more sophisticated embodiments, the video streaming application can use simultaneously both the first communication module 111 and the second communication module 112.

In some embodiments, the processor 120 is further operable to select at least one of the first communication module 111 and the second communication module 112 based on the status of one or more network providers and or wireless paths. The status may include, but not be limited to, at least one of a network traffic of the respective network providers, how heavy its bandwidth utilization is and the number of other end users it is serving, which both have implications on the quality, e.g., speed of Internet access that can be obtained through particular network providers.

Although not shown, in some embodiments, the processor 120 is operable to detect an interference on a frequency channel within a region of frequency band, and if the interference is detected, the processor 120 is operable to select another frequency channel within the region of the frequency band or to increase the radio transmission power of a communication module. For example, to overcome interference that may exist on the operating frequency band of the second communication module 112, as this could occur on the GSM 900 MHz uplink band, the processor 120 may choose to select a less busy channel within the 900 MHz frequency band or increase the transmission power of the second communication module 112.

If this Internet access is shared with third parties, a compensation may be provided to the user. In some embodiments, the compensation may be in a form of at least one of a digital currency, credit and token. The compensation may be determined based on a property that is used in measuring Internet access shared with third parties. Here, the property may include at least one of time (for example, the period of time in which Internet access is shared) and volume (for example, the amount of data shared measured in megabytes) of the Internet access shared.

It may be appreciated that each communication module 110 may have one or more internal or external antennas. For example, the first and second communication modules may have external antennas with a gain of 3 dBi or more, e.g. 5 or 10 dBi or more.

The device 100 may further comprise a network attached storage (NAS) capability. In some embodiments, the device 100 comprises a built-in NAS medium. Additionally or alternatively, the device 100 comprises a slot or a tray 130 for receiving an external storage medium (for example an SD card). Although not shown, the device 100 may connect to an external, larger NAS system via wired or wireless communication. The NAS is operable to store downloaded content. In some embodiments, if an electronic device tries to access the downloaded content, the processor 120 may decide to provide the electronic device with a priority Internet access, so that the electronic device can access the content stored in the NAS.

The device 100 further comprises a display screen 140. For example, the device 100 may comprise two to three line LCD screen and simple up-down-left-right-select-cancel/back navigation buttons. The screen 140 is operable to display information relating to at least one of volume used top-up (in say, megabytes), and a status of the Internet access (whether active or inactive, connected via 3G or LTE, as examples).

The device 100 further comprises at least one Input/Output interface 160 including, but not limited to, one or more Ethernet ports and/or USB (Universal Serial Bus) slots.

The device 100 further comprises a power supply 150. It may operate at 5 Volts using 3 Ampere current.

Figure 2:
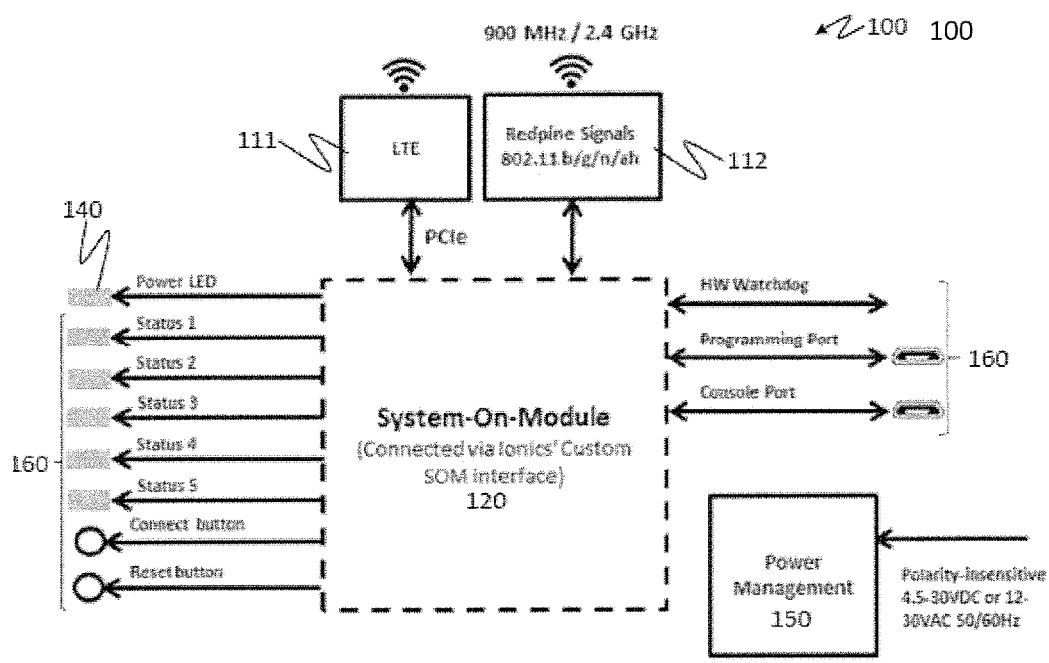

FIG. 2 shows a further schematic view of an embodiment of an apparatus as described herein. Apparatus 100 comprises a first module 111 which is provided as an LTE module. Moreover, apparatus 100 comprises a second module 112 which is implemented as an IEEE 802.11 b/g/n/ah device (e.g. available from Redpine Signals) operating at approximately 900 MHz and/or 2.4 GHz.

Apparatus 100 further comprises a control unit 120 implemented as a System-On-Module (SOM). The control unit may be connected via a SOM interface (e.g. custom made by Ionics). First and second modules 111 and 112 may be coupled to control unit 120 by a PCIe interface (Peripheral Component Interconnect Express).

Figure 5:
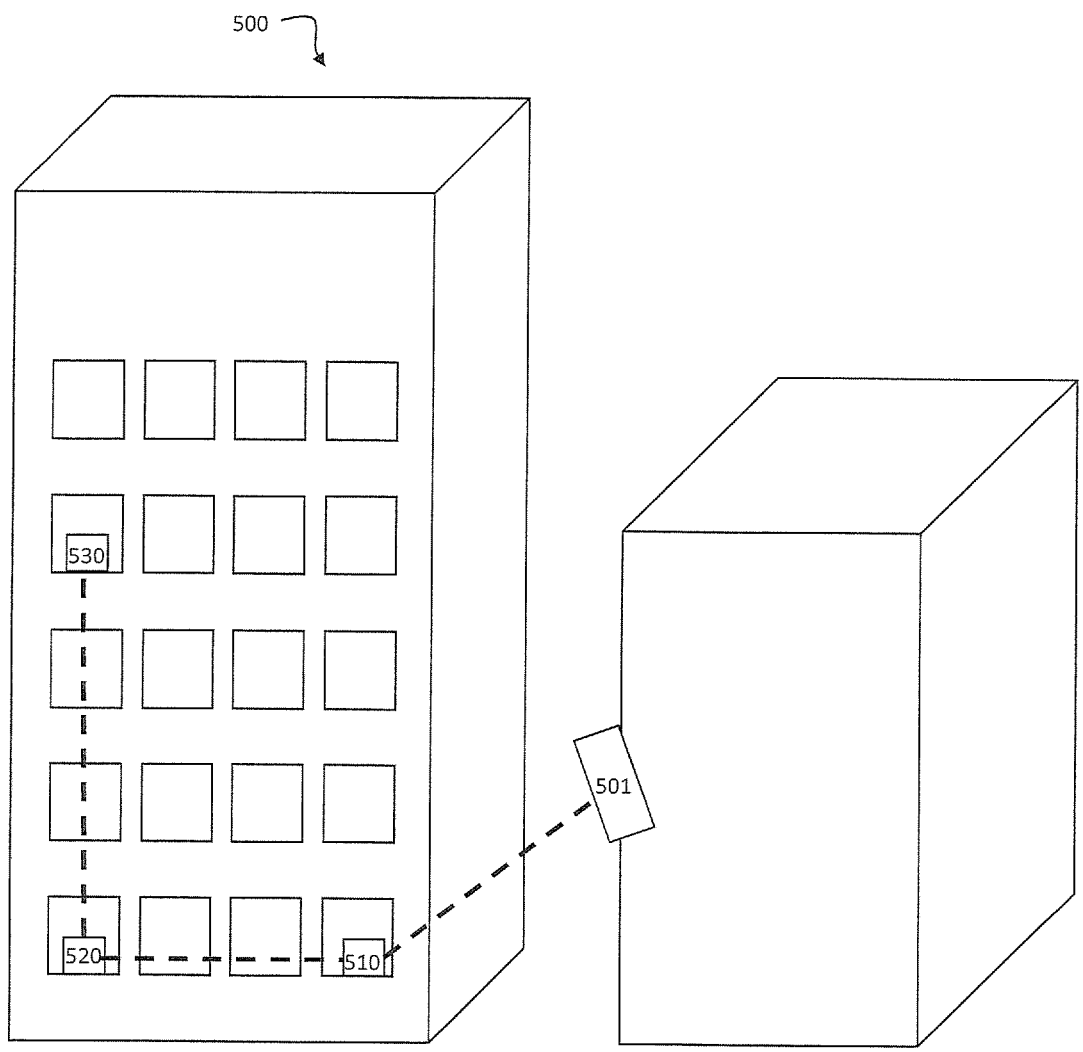
FIG. 5 illustrates a system in accordance with some embodiments for facilitating Internet access.

Control unit 120 may output several signals to be displayed on an LCD screen 140 of the apparatus 100, e.g., simply indicating whether it is powered or not, but also various other types of information as described herein (indicated by the reference numerals "Status 1" through "Status 5" in FIG. 5).

Apparatus 100 may comprise a power management module 150 operating at 4.5-30 Volts DC or 12-30 Volts AC (50/60 Hz).

Moreover, apparatus 100 may comprise an Input/Output interface 160 which may comprise a programming port, a console port and/or a hardware watchdog.

Finally, apparatus 100 may be equipped with a connect button and a reset button for manual user operation.

Further details/embodiments on the device 100 and a system comprising the device 100 in accordance with the present invention are described further below.

Figure 3:
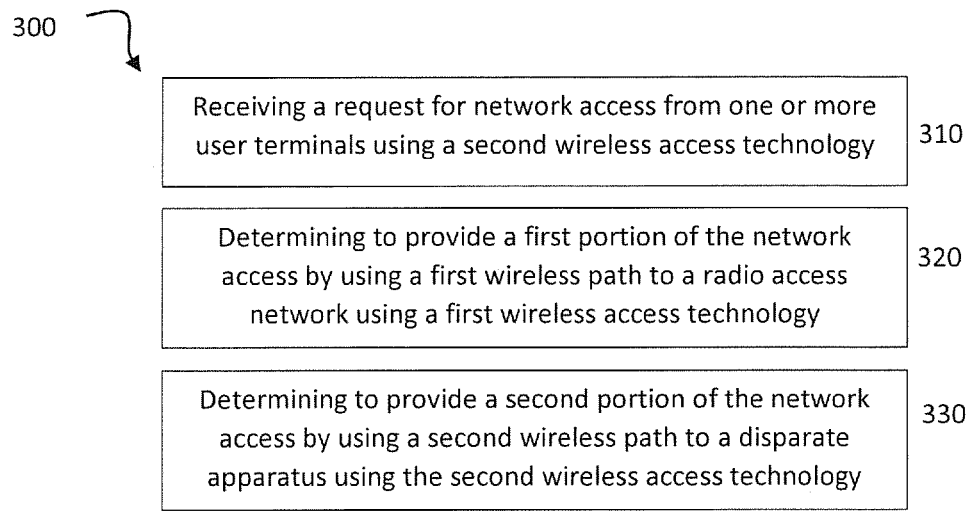
FIG. 3 illustrates a flow diagram in accordance with some embodiments of a method for facilitating Internet access.
Figure 4:
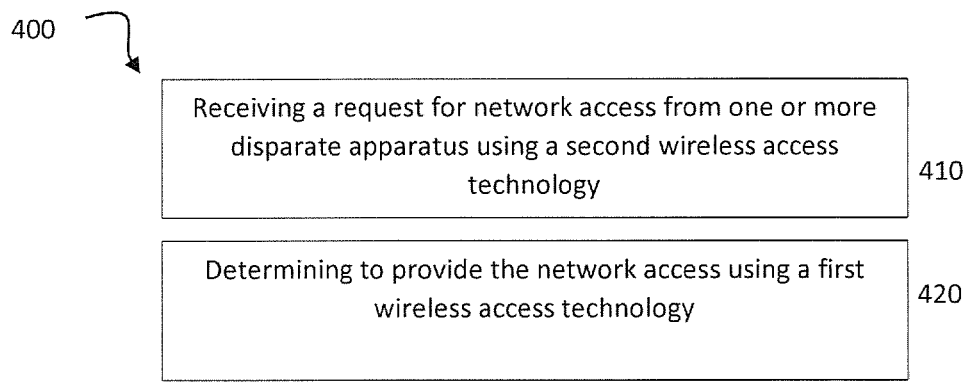
FIG. 4 illustrates a flow diagram in accordance with some embodiments of a method for facilitating Internet access.

FIGS. 3 and 4 show exemplary methods 300 and 400. It is noted that the steps are not necessarily shown in temporal sequence. The order of steps may be interchanged.

In step 310 of FIG. 3, a request for network access may be received from one or more user terminals using a second wireless access technology. The request may be received at an apparatus as described herein. In step 320, it may be determined, e.g. at the apparatus, to provide a first portion of the network access by using a first wireless path to a radio access network using a first wireless access technology. The first wireless path may be from the apparatus, to the radio access network. In step 330. A determination may be made, e.g. by the apparatus, to provide a second portion of the network access by using a second wireless path to a disparate apparatus using the second wireless access technology.

In step 410 of FIG. 4, a request for network access is received, e.g. at an apparatus as described herein, from one or more disparate apparatus using a second wireless access technology. In step 420, a determination is made, e.g. by the apparatus, to provide the network access using a first wireless access technology.

FIG. 5 shows an example 500 for deployed apparatus 510, 520 and 530. Apparatus 510 may be provided with a first module that provides LTE network access, and otherwise as described herein. Apparatus 520 and 530 may be similar apparatus. However, these do not necessarily have to provide LTE network access, but may, e.g., provide 3G and/or edge (2.5G) coverage only, or may only have second module as described herein (i.e., they may not comprise a first module). Apparatus 510-530 may be installed in a building, as outlined in FIG. 5. It is noted that 5 storeys are shown in FIG. 5 schematically, but the example is not limited accordingly. In particular, it is understood that the building may also comprise more storeys (e.g. bottom and top of the building are not shown in FIG. 5, but only a horizontal slice thereof).

Apparatus 510 may be placed such as to provide optimal wireless connection with an LTE antenna 501, which may be installed at a neighbouring building. For example, Apparatus 510 may be placed at a fifth or higher storey of the building.

Apparatus 520 and/or 530 may be placed at the same or higher storey of the building. This way, also for large area storeys, and particularly for higher storeys LTE network access may be provided, e.g. by sharing the LTE network access of apparatus 510 with apparatus 520 and/or 530 via their respective second modules, as described herein. It is noted that, although not shown in FIG. 5, apparatus 510 and 530 may possibly also directly connect to each other using their respective second modules, as described herein. Notably, although only three apparatus 510-530 are depicted in FIG. 5, also more or less than this number may be installed. Importantly, a network access by apparatus 510 (e.g. an LTE network access) may be shared with one or more further apparatus via respective second modules (i.e. the further apparatus do not necessarily have to comprise a first module that would provide direct internet access).

Multiple WAN System

The present invention may relate to the device 100 which includes, but is not limited to, a router and a modem. The device 100 may share the Internet access with third parties, and third parties may share the Internet access with the device 100.

The device 100 may comprise the first communication module 111 which can directly connect to the first network provider. This may be referred to as a "first WAN (wide-area network) source" or a "primary WAN source". The first communication module 111 may operate on 3G and LTE mobile network data connections.

In some embodiments, the first communication module 111 may be referred to as a primary communication module, which may obtain Internet access by connecting to the first network provider. In some embodiments, the speed of the LTE network connection may be upwards of 50 Mbps for download and 30 Mbps for upload. The speed of 3G network connection may be upwards of 0.6 Mbps for upload and 2 Mbps for download.

It may be appreciated that on the LTE network connection, the speed may hardly be sustained by the electronic device, for example a smartphone during regular use. For example, the speed of the LTE network connection required for download may be 3 to 5 Mbps, while media content such as video content are streamed and/or its files are updated on the electronic device. When the electronic device is inactive, for example when the electronic device merely receives notifications and/or updates thumbnail content, bandwidth use may drop to the range of about 128 Kbps or even lower.

To provide a solution that alleviates the challenges, at least in part, the second communication module 112 may obtain Internet access from a network provider (whether the same mobile network provider accessed by the first communication module 111 or not) through another device. This may be referred to as a "second WAN source" or a "secondary WAN source". For example, the second communication module 112 may occupy up to 10 MHz of a sub-giga ISM band and burst a network speed of up to 7 to 10 Mbps. It may be appreciated that in some embodiments 10 Mbps is more than enough to stream and download digital content with minimal buffering or interruptions.

The device 100 may be primarily set up in "load balancing" mode. In some embodiments, if one of the first communication module 111 and the second communication module 112 fails at least completely, the processor 120 may switch over to "failover" mode, and the other of the first communication module 111 and the second communication module 112 may be used in connecting electronic devices to the Internet. In addition, the following rules may be applied:

1) The load balancing mode may be done on the network layer (also referred to as "layer 3") using a "least traffic and/or least connections" method, which allows Internet traffic to be routed through network appliances and wireless delivery systems with the lowest traffic (which may also suggest least number of connections). In the device 100, the traffic may be routed through the communication device module with the lower traffic and less connections to the Internet.

2) A latency-based routing may be applied depending on the type of packets that traverse through the network. For example, games that require low latency can have their packets routed in a different way as opposed to HTTP packets. As another example, pertaining to content streaming activities, the content traffic may be routed through the communication device module with higher available bandwidth, not necessarily the one with the lower latency (for example, measured in tens to hundreds of milliseconds).

3) The device 100 may comprise storage devices, such as a NAS facility 130, to download and/or store content or files for later consumption or viewing. For example, where the user is trying to access the content that exists already in other communication devices' storage devices, then priority access may be given to such network-attached storage devices versus sourcing the content from the Internet through 3G or LTE. Thus, mobile data bandwidth may be saved. The protocol used in accessing the content and large files may be via direct download or streaming types or via peer-to-peer file sharing methods such as that used by Bittorrent™.

4) A digital streaming of content using multicast technology (including Miracast™-type protocol) may be relayed as such, using the same multicast protocol within the mesh peer network.

5) The device 100 may share the Internet access obtained from the fixed broadband means by end users, by operators and/or by enterprise partners. For example, if the user has access to fibre network, the user can choose to share this Internet access with other communication devices through the second communication module. The user may obtain a compensation for sharing his fibre network connection, to be described in the section below "Third WAN Source". The enterprise partners or end users may also install high-power and/or long-range wireless communications equipment, such as point-to-point microwave links, in order to tap fiber-based Internet from a distant location.

It may be appreciated that in selecting a medium to operate the wireless peer/mesh connections through the second communications module, much emphasis may be placed on range and ability to penetrate walls and other obstructions, and wireless communications protocols that are mature and widely accepted may be used.

In some embodiments, the device 100 may use sub 1 GHz "ISM" (or sub-giga) bands using 802.11 type protocol based on IEEE standard (also known as "Wi-Fi-").

It may be appreciated that frequency bands below 1 GHz have long-range propagation characteristics. For example, Wi-Fi™ operating on 900 MHz (802.11 type protocol based on IEEE standard) running at 27 dBm of power, outfitted with 3 dBi antennas or larger, and within line-of-sight of another device can easily conquer distances up to 10 km outdoors and 100 meters indoors.

Further, pushing Wi-Fi™ over a distance on sub-giga consumes less power than extending the range to cover the same using Wi-Fi™ running on 2.4 GHz.

Sub-Giga Band Selection for the Peer/Mesh Network

Sub-giga bands may require a license for an operator to use. In some countries, there are few ISM bands for public use, other than Wi-Fi™ on 2.4 GHz and 5.8 GHz and those used in amateur two-way VHF (Very high frequency) and UHF (Ultra high frequency) communications. Hence, in designing the second WAN source to run on the second communications device, it may be decided to go narrow (for example, below 10 MHz) and on bands that may be easily licensed by the network provider, either because they already operate communications on it, for example GSM™ (Global System for Mobile communications) running on 900 MHz, or have been licensed to different operators across geographically dispersed areas, for example TV UHF bands (also known as "white space"). In view of this, frequency bands that are not used in particular areas may be selected for the second WAN source to run on the second communications module.

In the device 100, the second communication module 112 may operate at part of the 905 to 915 MHz GSM band, occupying 5 to 10 MHz, using an IEEE 802.11 type wireless protocol standard, also referred to as Wi-Fi™. It may also be where the network provider operates the uplink portion of its GSM™ of the 900 MHz network.

In some other embodiments, the second communication module 112 may operate at between 600 to 700 MHz TV UHF bands occupying 6 to 8 MHz., the bandwidth used by the white space.

The selection criteria may be driven by such needs as minimising regulatory red tape and/or managing or anticipating interference issues that may arise.

Managing Interference (ISM versus GSM)

A radio interference may be a challenge to the peer/mesh network architecture and may be overcome through a combination of RF (radio frequency) power management and channel hopping techniques.

In the device 100, the uplink portion of the 900 MHz band used by GSMυ electronic devices may be selected. The interference in the uplink channel—from the electronic devices to cellular base stations—may be managed by a cellular network. Cellular base stations with greater RF power and larger antennas may be able to send control signals to mobile phones, asking it to switch to other channels or bands where their transmission can be better received by the cellular base stations.

The same type of coordination would be difficult if the peer/mesh network frequency were to run on the downlink channel of the GSM network, the frequency band where the electronic devices receive transmission signals from the base stations. The device 100 may have the potential to cause discernible interference on the GSM system's full duplex operation, since the device 100 could be within earshot distance of the electronic devices trying to receive signals from the base station; and relatively lower RF power can beat even a more powerful base station transmission located miles away.

An auto channel-seeking function in 802.11 type protocol based on IEEE standard protocols (Wi-Fi™) may also be used, when the device 100 detects the interference on its selected frequency band or channel and, hence, communicates on other channels within the band. In some embodiments, the device 100 may identify the interference caused by an associated telecommunications operator's (for example, a partner telecommunications operator's) GSM™ operation; in which case, priority may be given to such GSM™ traffic by selecting another channel to operate the peer communications and/or by lowering the RF power of the second communications module.

When the device 100 knows that the interference is coming from sources other than the licensed GSM™ by the associated telecommunications operator, for example from an illegal use of the frequency band (e.g. 900 MHz) or from an unintentional use by typical home appliances such as microwave ovens, the device 100 may choose to avoid the interference by selecting another channel and/or by simply increasing its RF power to overcome the lower power interference.

To identify whether the interference is coming from the telecommunications operator's uplink GSM frequency bands, a radio for GSM™ of the 900 MHz may be embedded into the device 100 to proactively scan nearby GSM™ use of the 900 MHz band by electronic devices.

The frequency reuse strategy described above may mix Wi-Fi™ based protocols with that of GSM™. In this regard, the device 100 may detect the interference, select a channel and/or band, and dynamically set the RF power levels.

In some embodiments, conventional techniques to manage interference such as multiple access techniques, radio resource management and dynamic resource management techniques may be additionally or alternatively used.

Third WAN Source

As described above, the device 100 further comprises a third communication module 113, which allows a user such as an owner or a subscriber to share unused bandwidth with a third party.

The user who owns access to relatively cheap fixed broadband such as DSL, fibre and microwave, may find that he has unused capacity during certain times of the day, for example when he is at the workplace.

The device 100 is further able to use the network connection through DSL, fibre and microwave which may be relatively cheaper and more reliable network connection.

The user who has the excess network capacity may wish to share the excess bandwidth with the third party, in exchange for some form of payment, for example in the form of digital currency, credits or tokens.

In view of this, in some countries where the network connection is relatively expensive and scarcer, the third WAN source may be useful to share the network connection with third parties. The compensation may be provided to the user who shares the network connection, as follows:

1) The user who can obtain the unmetered Internet access with a minimum speed, may be qualified to share this Internet access with third parties. For example, the user who can obtain the Internet access that can share multimedia content such as video and high-fidelity audio formats to others via steaming without interruption or buffering may be qualified.
2) There are several parameters to measure and/or quantify the network connection shared. The parameters may include, but not be limited to speed and latency tolerance. The parameter may further comprise the network used during peak hours or off-peak hours.
3) The various types of network connection shared are as follows: Class A (for example, network shared during peak hours and capable of up to 30 simultaneous YouTube™ streams); Class B (for example, network shared during off-peak hours and capable of up to 30 simultaneous YouTube™ streams); and Class C (for example, network shared for browsing but not capable of simultaneous YouTube™ streaming without buffering).
4) The network shared may correspond to some quantity of utility tokens, for example, determined by a market-driven exchange rate. In some embodiments, these tokens may have real value or equivalents and that the act of network sharing may resolve a congestion at the telecommunications operator's network, improve user experience, and save the capital expenditure.
5) Eventually, these tokens may be shared, transferred and/or traded for other goods, cash or cryptocurrencies.

Blockchain technology and cryptocurrencies may be used. Smart contracts may be entered into by telecommunications operators, network service providers and/or subscribers, and secured by the blockchain. The parties may agree with some iteration of the following terms:

1) The rate by which new tokens are issued to the user (who shares his network connection through the third communication module 113) per unit of the network shared (e.g. in megabytes): The rate may depend on the number of the parameters as described above. For example, a simplification is the assignment of Class A to Class B.
2) The exchange rate by which the initial associated telecommunications operator may trade tokens for the network connection: For example, 4 token units per 1 MB used on 3G/LTE™
3) The exchange rate by which another mobile network provider may trade tokens for the network connection: For example, premium network connection, via Wi-Fi™
4) There may be an initial coin or token offering to finance a larger infrastructure to support the creation of more WAN sources accessed through the third communication module. Such networking infrastructure may take the form of small cells, enterprise grade Wi-Fi™ and/or long-range microwave links. These media may represent forms of connectivity much cheaper than their 3G/LTE™ counterparts.
5) The security type of ICO™ versus a utility token may be used in financing the infrastructure in (4).

The above mechanisms may make the data token ecosystem viable. They enable telcos to cover the same number of people, if not more, without the need for spending too much on additional cell site infrastructure, outdoors or indoors, e.g., femtocells and small cells.

Incentives to Share Unmetered Internet

The above mechanism may be useful to a user who, for example, may reside in a network strategic point such as high places that have line-of-sight to other places with cheap fibre network. For the user, there is no incentive to build microwave even for themselves. In those circumstances, the user may rather pay for 3G/LTE based network.

With the above mechanism, the user can resell the excess network connection beyond what they need and obtain the incentive and/or compensation. For example, one can use point-to-point microwave links, covering distances above 50 km and capable of delivering hundreds of Mbps in speed. Such point-to-point microwave link can now be set up for less than one thousand US dollars, which is a dramatic drop in price compared to that of several years ago.

The above mechanism ought to allow more people to enjoy cheaper and more reliable Internet, for example, as a result of a more widely distributed sourcing of Internet connection from those who can provide it more efficiently.

Bandwidth-Efficient Delivery of Video Content

Most consumers judge the quality of their Internet connection primarily by how smooth or buffer-free the user is able to watch a video content. The other metric used to determine the quality may be how reliable the user can do voice and video calls. In view of the above, these techniques for the delivery of the video content are used:

Edge Cache-ing of Video Content: A video content may be stored in network attached storage (NAS) devices by the network connection through the second or third communication modules 112 and 113. The greater the density of users served, and the more likely that particular types or genre of the video content would be accessed, the closer to these user would video content be cached. The number of hops and/or links from the NAS where the video content is stored to the end-users is decreased.

Edge Cache-ing at the Device Level: Video content at the device may be easily streamed for viewing by electronic gadgets, such as tablets or smartphones, directly connected to the device via WiFi. The video content may also be shared with third parties, through their routers or devices, using, for example, peer-to-peer types of protocol such as the BitTorrent™ protocol. In this regard, even though the SD cards may have limited storage, the device 100 may help improve video delivery quality and decongest overall network traffic in a particular location.

Peak Hour/Off-peak Hour Delivery of Video Content: The telecommunications operator may provide cheaper video data plans by enabling the time-shifting of video downloading. For example, the user may select an option to stream a popular movie at a later time versus now. The device 100 may choose a strategic time to start recording or downloading a movie on the micro SD cards or on nearby NAS devices when there is less network traffic.

Partnerships with Content Providers: Partnerships with content providers such as content distributors or content owners and local TV networks may be formed. This would allow the delivery of locally stored content (at the NAS) to be delivered seamlessly through the Content Providers' proprietary Apps or through their SSL-encrypted websites.

Not just for videos, but for any heavy content that tend to be accessed regularly: The disclosure herein may not be limited to the video content. The methodology of the delivery video content can also be applied to other types of content such as music, Podcasts™, Apps, and OS downloads/updates.

Top-up of Airtime through Host System and Third Party "Counting" System of Volume Used The design of the device 100 may represent improvements in the user experience solving many of the current pain points encountered when operating prepaid mobile devices such as 3G LTE modems. One example of such pain point is when users need to top-up their prepaid accounts.

Conventional LTE modems supplied by some telecommunications operators integrate a SIM card, which can be topped-up for prepaid Internet access. The user may keep an alternate SIM card to switch to when it is time to top-up.

Conventional IN (intelligent networks, also used for billing) systems were not designed to notify in real-time or with any accuracy (to the minute or even by the hour) whether the user has used up his allocation, for example 100 MB or 1 GB. There was no need for that type of precision with monthly billed accounts for the postpaid users.

Also, as long as there is any active data plan of any sort, for an application or a bunch of applications, the user may be unable to top up a prepaid account's network wallet until the active data plan or plans expire.

The device 100 may solve the above problems as follows:
1) The device 100 is equipped with an LCD screen that displays pertinent information as to the volume or whether the network is active, and further display instructions and passcodes needed to top-up the device 100. Topping-up can be accomplished separately on the user's electronic device via peer-to-peer transfer of credits, eliminating the need to physically remove the SIM card as this may be the typical practice of many prepaid modem users.
2) Top-up of the device 100 may be facilitated through a simplified identifier such as dynamic and algorithmically generated 5-digit numbers, displayed on the device 100 LCD screen, without the need to memorise any other identifier of the electronic device and complicated syntax or commands.
3) Almost real-time counting of volume allocations may be enabled and performed at the device 100 level, abstracting the need from the telecommunications operator's IN. An own accounting system may interface with the telecommunications operator's IN.

Process for Top-up by User

Data plans may relate to the users connected to particular routers. In some embodiments, the data plans may not relate to the users connected to the network bandwidth shared through the mesh network. Typically, it may be unwieldy for the telecommunications operators to redesign their billing system to make this distinction as most telecommunications operators' billing systems may revolve around prepaid users identified through SIM cards. However, the system in accordance with the present invention, may revolve around the device 100, for example a router/modem, likely identified through a MAC (Media Access Control) address or IMEIs (International Mobile Equipment Identity). In this regard, the user may pay for the device's 100 network connection.

In some embodiments, the process for top-up may be as follows:
1) The user triggers a top-up by either accessing an application, landing on a website, texting commands to a short code, or calling a USSD (Unstructured Supplementary Service Data) number (for example, *143#).
2) In some embodiments, at predetermined intervals (for example, every three (3) minutes), the device's 100 screen 140 (for example, LCD screen) displays a 5-digit code. In some other embodiments, whenever a button is pressed on the device 100, the LCD screen displays a 5-digit short code for a predetermined period (for example, for ten (10) minutes). This may identify the device 100 whose users are to be given the Internet or network connection. (The device 100 itself can be sharing the network connection with other users through different devices, whether or not the users connected to the device 100 have access to the network via a data plan.)
3) The 5-digit code may be dynamic (versus permanently indexed to a specific device 100). Further, the 5-digit code may be time dependent, which allows the identification of a particular device with just those few digits.
4) With an application or through a website, the owner of the device 100 may enter the 5-digit code, select a particular data plan, then enter a mobile number. In this case, it is the mobile account of the user associated with the mobile number to be charged for the selected data plan. A text may then be sent to the mobile number, asking if the user wishes to pay for the data plan with the user's own prepaid or postpaid account as the mobile account. For example, if the user replies "YES", the transaction may be confirmed, and the data plan may be activated for the device 100.
5) As for triggering using the text, the mobile account may be triggered by sending the short code a message, for example "<5-digit router code> <data plan ID>". The user may then get back a text asking for confirmation. For example, if the user may reply "YES", the transaction may be confirmed, and the data plan may be activated for the device 100.
6) Finally for the USSD triggered service, the mobile account may dial a USSD number using a predetermined format, for example "*143#, <5-digit short code>". The system may answer back by saying that the user is topping-up a particular device and ask the user to choose from any of the following available data plans. For example, if the user may choose a particular item on a menu and press "send", the transaction may be confirmed. The device 100 may be topped-up and the amount for top-up may be billed to the user's mobile account.

Counting by Device

As to SIMs inserted in the device 100, the device 100 itself may do the counting, such as volume in megabytes or gigabytes being used by the users connected directly to the device 100 versus the volume being shared through the mesh network with other devices.

The function of the counting of the volume may be accomplished by an application operating on a variation of an operating system (for example, a Linux™-based open source operating system such as OpenWRT™).

The device 100 may do the counting and records may be sent back to the central billing servers. The centralised billing servers may compile these records and communicate continuously with the telecommunications operator's IN in a direct fashion via APIs and the like.

Iteration of Wi-Fi™ Offloading to Expand the Coverage of Cellular Base Stations and Offer Better Indoor Coverage Wi-Fi™ is typically provided by mobile network operators, by setting up Wi-Fi™ hotspots in high traffic locations where they can offload traffic to cheaper, stronger, and more sensitive Wi-Fi™ network connections running on fibre for mobile users while at the same time freeing up space in the scarce 3G LTE spectrum. In this manner, the users may enjoy a far better network experience, whereas with LTE networks, especially in busy areas, they may easily get filled up, in which case users may have to be downgraded to 3G or worse 2.5G networks—as practiced by many telcos.

The device 100 may act like hotspots ready to offload 3G LTE network connections on tap to mobile users who come near it, as they enter a building for example, where one of these devices are set up. The difference is that the hotspot may no longer belong to a telecommunications operator's set-up. The hotspot may be a Wi-Fi™ access point installed by the system in accordance with the present invention. The Wi-Fi™ hotspot may have been opened up by an ordinary user who has set up the device 100 and signed up to share his Internet connection. The user may do so with a view to earn rewards/tokens even as the user has played a part in democratizing access. The user may explicitly assign a second SSID (Service Set Identifier), for example "Globe Telecom Community WiFi", visible to other users in the vicinity.

For the telecommunications operators, it may result in less stress on the outdoor cellular network and less stress even on their indoor small cell/femtocells, even as a greater number of Non-LTE supported smartphones are able to tap "indirect" or "crowd-sourced" connections via WiFi delivered by the devices 100. In this manner, the telco benefits lowering traffic on its 3G LTE networks and minimizing the need to invest in additional 3G LTE capacity.

Iterations of how one's data plan is consumed or used up may be applied, if it is connected via the device 100 on Wi-Fi™ offload mode. It may be done on a one-to-one basis, i.e. each volume (for example, in MB unit) used up is equivalent to the same volume consumed using a prepaid plan on 3G LTE. In some embodiments, through some agreements with the telecommunications operators, much less may also be charged, if at all, against the user's 3G/LTE™ volume allocation on his prepaid or postpaid data plan.

Business or Revenue Model

Types of software revenue in accordance with the present invention may be as follows:

a) Direct Consumer Charge

The system may charge directly the user, for example through a credit card, online wallet, and the like. There may be a premium charge for unlocking features in the device 100, such as time shifting of content downloads during off-peak hours. Other features that can be unlocked by paying fees may be the ability to share and earn from the "third WAN source", the same may include, but not be limited to, backing up contents, photos and videos into the SD card or a cloud storage, securing Internet access via a VPN, downloading applications to operate on the router, factory-unlocking of the router to be able to work with other telecommunications operators, and so on.

b) Revenue-Sharing Partnership with a Network Provider

This involves the telecommunications operator making a direct "line item" charge, also referred to as "operator billing" on one's prepaid or postpaid account.

Any of the features listed under "direct consumer charge" may also be applied. However, these events may tend to be more regular, recurring in the following:

Pay-per-view of movies, TV shows, shorts (many to be delivered using the Edge Cache-ing system)

Time-shifting, pre-selection of movies and shows for later viewing—where the system may shift the downloading of video material during non-peak hours, for viewing at a later time, when it is more convenient for the user Cache-ing of HD music/playlist/Internet radio-type on the SD card or nearby NAS device for time-bound listening Commission from the telco for every prepaid top-up transaction that uses the system c) Revenue-sharing Partnership with Content Providers Content provided by distributors, licensors, and content providers are prioritized by the system by either giving it wider bandwidth or by storing the popular ones on the "edge" i.e., micro SD cards, NAS devices nearby.

In most of the developing countries, where expensive 3G/LTE access is the predominant means of connecting to the Internet, the cost of access dwarfs the monthly charge of video on demand providers.

By implementing an edge cache-ing system, the device 100 is able to shape traffic and maximise the use of limited bandwidth allowing more users to watch videos (stored in nearby NAS devices) without buffering and at cheaper costs compared to streaming videos directly from a server, which consumes more bandwidth.

Further, the device 100 may be configured for the delivery of content via IPTV protocols and standards. In addition to video-on-demand (unicast) as above, this may also cover Live TV or streaming (multicast). This, however, can be made available to users when unmetered network connection is present in a mesh network through the third WAN source.

In this regard, the content provider such as content distributors and/or content owners may be charged for the prioritized delivery of Video-on-Demand and live streaming content through the mesh network.

Advantages of the Invention

In many developing countries, multi-story buildings may rarely have structured cabling (for example, for data, CAT5/CAT6). The most predominant means of connecting to the Internet is through 3G/LTE. However, most cell sites have directional antennas pointed slightly downwards.

To improve their network connection, users often use directional antennas connected to their 3G/LTE modems by their windows pointed downwards at the telecommunications operators' cell sites.

The present invention may overcome these obstacles by allowing the mesh network to operate using sub-giga wireless connections that cut through building walls and floors.

In one setup, the telecommunications operator may choose to install one or more enterprise-grade powerful LTE modems (e.g. as provided by an apparatus as described herein) at a strategic location of the building, likely at a middle section of the building, with an external antenna facing nearby cell sites. Its primary purpose may be to spread the network connectivity through the device in the building via the mesh network. This may serve as a more affordable and more easily configurable alternative to laying down structured cabling or installing femtocells, microcells, and the like.

The device 100 may address the need for reliable connectivity. The device 100 may enhance inefficiencies by decentralizing bandwidth provision and enlisting the crowd/users in redistributing connectivity to more users.

The device 100 may become central in the futuristic household that which goes beyond giving reliable Internet access to electronic devices such as smartphones, tablets, desktop computers and set top boxes. In this manner, the device 100 may make the smart home, and become central to Internet of Things (IoT) of connectivity, energy, security, safety, entertainment, and so on.

It may be appreciated by the person skilled in the art that variations and combinations of features described above, not being alternatives or substitutes, may be combined to form yet further embodiments falling within the intended scope of the invention.

Towards Affordable Internet for all: The Power of Legacy

The challenges described above are shared by fledgling ISPs as much as incumbent or aspiring Mobile Network Operators (or Telcos) towards providing universal and affordable connectivity for all.

We aim at commercializing the technology particularly for the Philippine telcos who by the end of the last decade were already reeling from the imminent wipeout of their traditional voice and SMS services in the hands of OTT (over-the-top content) services appearing to insult the "dumb" telco pipes.

And so our legacy includes POWERAPP™, which actually focuses on maximizing the Telco's backhaul to the Internet pipes (in this case, PH Smart Communications') in order to serve more of their subscribers. Powerapp accomplished this by "deconstructing" the Internet into its many traffic lanes, repackaging the so-called lanes in affordable bundles, allowing only certain apps to run, while throttling or outrightly blocking other bandwidth consuming activities not essential to what the customer wants to achieve at that moment e.g., Facebook and Viber only, No OS updates, No File Sharing, SD Only Youtube).

We essentially repacked the Internet into bite-size pieces, allowing people to pay only for what they need "on-demand" e.g., Wikipedia—free with every purchase of a P10 Unli Text package, FB and Viber for P10 only. In the case of prepaid volume-based plans, our subscribers were able to maximize the "validity" of say a 1 GB plan to several days, if not weeks. That's the Internet on a sacheted basis.

By managing certain Internet traffic, such as the updating of one's iPhone, or the constant syncing of a cloud-stored data (such as via Dropbox) substantial data traffic can actually be saved. Thus, by allowing only certain types of Internet data to pass through (only those that are essential or requiring real-time information) and by managing other bandwidth heavy applications, we dramatically reduced the strain on what is truly a finite resource—allowing more people to tap into the Net. It is much like road-use policy that favors efficient mass transport heavily.

PowerApp was a neat proposition that signed up 11 Million users in what was then (2013) a nascent smartphone market.

But then, as now, "The Last Mile" remains an issue.

The Slippery Slope

One might say it has been a slippery slope for telcos, successfully marketing data while overselling its capacity (as much as 3×, easily) and they continue to do so under the current schema—a vicious cycle.

It is a market after all where people, left to "un-metered Internet," would help themselves to all the rich media and video they have come to expect all paid-for and on-demand.

How to Serve Rich Media and Video Demand and Still Earn a Tidy Profit?

The CONVENTIONAL APPROACH by the MNOs/Telcos to the problematic, the economics of connectivity described above may be summed up as follows:

1. The proliferation of app per app sales and sub 100 giga plans,
2. The struggle to make WiFi work, again using conventional tech (primarily made to address a high ARPU/postpaid market),
3. Using bundled data to sell the higher margin voice and text plans; voice and SMS being the gravy still.

The 700 Mhz Digital Dividend

In 2016, Smart Communications and Globe Telecom—The Philippines' two leading telcos, acquired the 700 MHz and other frequencies from an idle third player.

Quite apart from the touted better mobile Internet experience (stronger, farther reach) bandied about by the two players as a result of such acquisition, we are now also witnessing the rise of the HOME LTE WIFI ROUTERS piggybacking on the newly acquired frequency.

To be sure, this has opened a new market and ignited another growth inflection point for the telcos, and even with only 5% of all mobile phones in their subscribers' hands LTE-capable and thus currently able to take advantage of the new digital dividend.

Under the Same Sky

In any case, given the centralized giant base station and the need to penetrate walls and travel long distances, be it 700 MHz or any LTE band, they are governed by the same laws of physics—that as a rule, a base station can only accommodate a finite number of concurrent users (whether they are surfing at 100 Kbps or watching Netflix at 3 Mbps).

In the end, even the touted digital dividend will soon run into the same problems encountered in the past—the 700 MHz will run out of space and they will need to resort to "signal rationing."

Dual (Multiple) Wan System

An important aspect of the present invention is the ability of our routers, in proximity, to work or help each other out in terms of sourcing or giving Internet access. Like conventional 3G/LTE routers, ours connect directly to the telco's mobile data network.

Like the present-day LTE home routers, ours run on few and select LTE and 3G bands so as to lower costs. Ours operate on LTE bands 700 and 1800, and 3G on 2100.

One's direct mobile data connection with the telco is the primary means of connecting to the Internet, i.e., the primary WAN source. LTE speeds can run upwards of 150 Mbps download, and 50 Mbps upload, while 3G does 2 Mbps upload, 7 Mbps download. (The HSPA+ version of 3G runs faster at 22/42 Mbps.) On LTE, we note however that these types of speeds are hardly ever sustained by the smartphone during regular use. 3 to 5 Mbps is more likely the download speed required while actively streaming media or updating files. The effective speed of LTE drops significantly when only few cell sites can cater to a large community, and oftentimes drops are annoyingly frequent.

It is in this light that we've designed the second WAN interface to occupy not beyond 10 MHz of a sub-giga band and burst Internet use at 7 to 10 Mbps (10 Mbps is more than enough to power most smartphones in media streaming and file sharing/downloading mode).

Our dual (or more) WAN system is primarily setup in "load balance" mode, unless the other WAN interface fails completely, then the system would naturally switch over to "failover" mode. Further, we apply these rules:

1. Load balancing is done at the network layer (also referred to as layer 3) using the "least traffic and least connections" method, which in general says that traffic shall be routed to servers with the lowest traffic. In our case, traffic will be routed to the WAN source with the lower traffic and less connections (to the Internet)
2. Latency-based routing may be applied depending on the type of packets that traverse through the network. For example, games that require low latency can have their packets routed a different way as opposed to HTTP packets. On the other end of the spectrum, we take the example of Netflix or media streaming activities on the Internet. in this situation, it is more important that Netflix traffic be routed to the WAN source with higher available bandwidth, not necessarily the one with the lower latency (typically measured in tens to hundreds of milliseconds)
3. Our Super LTE WiFi routers are configured with storage devices, in this case an SD card, to download and store content or files for later consumption or viewing. In the scenario where a user is trying to access content that exists already within his peers' storage devices, then priority access is given to such network-attached storage versus cloud access via 3G or LTE, thus saving mobile data bandwidth. the protocol used in accessing content and large files could be via direct download types or via peer-to-peer file sharing methods, such as that used by Bittorrent™. Also CDNs (content delivery networks) may be used.
4. Digital streaming of content using multicast technology (including the "Miracast" type protocol) will be relayed as such, also using the same multicast protocol, within the mesh peer network.
5. Though we've described peer WAN sources as those made available by consumers who access the Internet via 3G or LTE, we are also enabling the sharing of Internet from fixed broadband by consumers and by us or by our enterprise partners. For example, if a user has access to fiber Internet, unmetered and all, he can choose to share this through his peer network. In this scenario, he gets compensated for sharing his fiber connection (please see the section below entitled "A Third WAN: Compensating peers who are "net" Internet connection providers."). Enterprise partners may also install high power/long-range "peer" WAN sources where we can tap cheaper Internet from fixed broadband connections, such as DSL, fiber, and microwave.

In selecting the medium to run our wireless peer connections, much emphasis has been placed on range, ability to penetrate walls and other obstructions, and that it would use wireless communications protocols that are mature and widely accepted.

For our first version, we are using sub-giga "ISM" bands using IEEE 802.11 type protocol (otherwise known as your typical "WiFi"), which enables much longer range, better penetration, while using less power.

Frequency bands below 1 GHz have excellent long-range propagation characteristics. For example, "WiFi" on 900 MHz (802.11 based on IEEE) running on 27 dBm of power, outfitted with 3-6 dBi antennas, and within line-of-sight of another radio can easily conquer distances up to 10 kms outdoors and 100 meters indoors (with directional antennas, range can reach as far as 50 kms outdoors and 400 meters indoors).

Further, pushing WiFi over a distance on sub-giga consumes much less power than say extending the range to cover the same of the standard 2.4 GHz WiFi.

Sub-Giga Band Selection for the Peer Network

Sub-giga bands, for the most part, require a license for any operator to use. In fact, e.g., in the Philippines, there are few "ISM" (license free bands) other than the amateur two-way VHF and UHF frequencies and WiFi on 2.4 and 5.8 GHz. Hence, in designing the second WAN source, we've strategically chosen to go narrow (<10 MHz) and on bands that are easily licensed by our telco partner(s), either because they already run communications on it, e.g., GSM 900, or have been licensed to different operators across geographically dispersed areas, e.g., TV UHF bands a.k.a. "the white space." This means we can select frequency bands that are not used in particular areas.

In our first version of the super LTE WiFi modem (an example for the apparatus as described herein), our second WAN source runs on part of the 905-915 MHz (anywhere from 5 MHz to 10 MHz) using an IEEE-based WiFi protocol. Not coincidentally, this is also where the telco runs the uplink portion of its GSM 900 network. Our other choices are in the 600 to 700 MHz TV UHF bands, each occupying 6 to 8 Mhz.

Our selection criteria are largely driven by minimizing regulatory red tape and managing interference issues that may arise.

Managing Interference, Ism Vs GSM and "Microwave Ovens", Improving "Spectral Efficiency", and "Dynamic Resource Management"

Radio interference presents challenges to our peer network architecture that must be overcome through a combination of RF power management and channel hopping techniques.

In our first version of the Super LTE WiFi router, we selected the uplink portion of the 900 MHz band used by GSM phones. Interference in the uplink communication—from phones to cellular base stations—are more easily managed by a cellular network. Base stations, with strong RF power and larger antennas, are better able to communicate to mobile phones and are also able to tell them to switch to other channels or bands, when the base stations are finding it difficult to listen to the mobile phones. The same type of coordination would be more difficult if we had chosen to run the peer network frequency on the telco's downlink channel—those frequency bands used by cellular base stations to transmit data to phones. Our Super WiFi LTE modems would have the potential to cause discernible interference on the GSM system's full duplex operation since our WiFi routers could be within earshot distance of the phones trying to listen to the base station, and relatively lower RF power can beat even a much more powerful base station transmission from miles away. (Phone jammers principally operate this way, by "jamming" the telco downlink channels.)

The apparatus may make use of the "auto" channel-seeking function in 802.11 IEEE WiFi protocols. This may be the case, when the apparatus (e.g. the WiFi modem) detects interference on its selected frequency band (or channel) and hence communicates on other frequency bands (or channels) within the band. It is also a possible option to configure the apparatus (e.g., the WiFi modem) such as to identify interference caused by (e.g., our partner telco's) GSM operation, in which case, we will give priority to such GSM traffic by selecting another channel to run our peer communications/mesh network and/or by lowering the RF power of the second modules (e.g. WiFi radios).

When the apparatus (e.g. WiFi modem(s)/router(s)) knows that interference is coming from sources other than the licensed GSM (by our partner telco), likely from "illegal" use of the (900 MHz) frequency band or that presented unintentionally by typical home appliances (such as microwave ovens), our apparatus will choose to avoid the interference by selecting another channel and/or by simply increasing its RF power, to overcome the lower power interference.

To identify whether interference is coming from the telco's uplink GSM frequency bands (e.g. by mobile phones seeking to connect to it), a 900 GSM scanning function may be added, which proactively scans for nearby GSM use of the 900 MHz band by phones.

Our explanation of how we manage interference has been simplified, but the approaches are generally similar to those employed by telcos to allow many more users per given frequency band: "Multiple Access" schemes, "Radio Resource Management", and "Dynamic Resource Management" techniques.

We highlight however how we depart from the conventional telco techniques, in that our frequency reuse strategy mixes WiFi ISM protocols with that of GSM (versus just GSM for telcos). This is why we rely primarily on levers within our control—the settings of our WiFi radios (or more generally, the second module(s)): interference detection, channel and band selection, and the dynamic setting of RF power levels. (GSM on the other hand relies on a "whole network coordination", synchronized clocks, and similar.)

A Third Wan Source(S): Peers Who Wish to Sell their Internet Connection to Our Mesh Router Network Similar to how excess solar energy generated by home solar systems may be supplied to the grid crediting back the net meter, a third WAN (e.g. third module), built into our apparatus (e.g. router), allows the owner/subscriber to share excess bandwidth.

Homeowners and establishment operators who have access to cheap fixed broadband—DSL, fiber, microwave-based—may find that they have unused capacity during certain times of the day (e.g., when they are at work, or in the case of an establishment, when business is closed). Internet capacity is a "perishing good"; technically, unutilized capacity is gone forever.

Our apparatus (e.g. super WiFi LTE routers) may be adapted to tap into fixed home fiber and DSL connections that are profoundly cheaper and more reliable broadband sources. This is a subset of the so-called third WAN source.

As we speak, in many communities, there are few who do have access to un-metered broadband, some provided by the telcos (since they happen to be near a main road paved with fiber), because they may have their own private Internet network (corporates or government institutions, such as law enforcement entities), or because they have easy access to microwave sourced Internet. The latter may be the case if they sit on a high place and have line-of-sight view of WISPs or ISPs that allow microwave connection. Hence, those with excess Internet capacity may wish to share excess bandwidth in exchange for some form of payment, more likely in the form of digital currency, credits, or tokens.

It is worthwhile to point out though that there are cases in which people band together to share Internet connection without direct remuneration, such is the case with America's take on so-called wireless community networks. Town folks band together, setting up long-range WiFi towers to share un-metered Internet connection with others, a mesh network of many sharing their Internet, slow or fast, results in faster Internet, on average, for its members. Further, the community network is able to cover homes otherwise that do not have access to un-metered Internet.

In the Philippines, where Internet is expensive and much scarcer, we have to put in place a means of compensating those who share. The mechanics may be adapted similarly as follows:

1. Members with access to unmetered broadband Internet, with a minimum speed, are qualified to share. (A more meaningful criteria than speed is connection that can serve multiple streams of Youtube buffer-free. However, it is a bit of challenge to explain this to prospective sharers; instead, we will periodically perform our own Youtube tests and communicate with sharers accordingly.)

2. There are several parameters by which we can measure and quantify Internet shared. The most obvious of which is through volume (or "MB's"). Time-based measurements are also a possibility, provided that minimum speeds and maximum ping latencies are achieved. Some hybrid of MB, low latency, and time, that which takes into consideration peak and off-peak Internet usage hours, would be fairer. Further, we may choose to count only MB's that are good enough for multiple streams of Youtube (say, up to 30 individual HD streams).

3. For illustrative purposes, we lay out three types of MB shared: Class A MB (that which is Internet shared during peak hours of use and capable of up to 30 streams of Youtube), Class B MB (that which is Internet shared during off-peak hours, capable of up to 30 streams of Youtube), and finally Class C MB (that which is good enough for browsing but cannot reliably deliver buffer-free Youtube).

4. For every MB shared there corresponds some quantity of "utility" tokens, determined by an "exchange." To the extent that we are able to provide wider coverage and faster Internet, these tokens ought to have value—they have helped ease Internet congestion at our telco partner network, improved their customers' experience and thus saved CAPEX.

5. Eventually, these tokens may be shared, transferred, even traded for other goods or cash, as would be customary of cryptocurrencies. hence our invention does not preclude a marketplace where tokens, not just ours are traded.

The blockchain technology and cryptocurrencies are natives to this setup. Smart contracts are entered into by telcos, ISPs, and subscribers, all secured by the blockchain. The parties agree to some iteration of the following terms:

1. The rate by which new tokens are issued to Third WAN source providers per unit of Internet shared (e.g., MB). The rate will depend on a number of factors as enumerated above. A simplification is the assignment of class A to class B type of MB shared.

2. The exchange rate by which our initial partner telco will trade tokens for mobile data connection, e.g., 4 token units per 1 MB used on 3G/LTE.

3. The exchange rate by which third party Internet providers, such as our own Mykapits™ community WiFi, will trade tokens for (premium) data connection via WiFi. From an economic point of view, more data tokens ought to purchase more MB's or time on a WiFi network than it would on the more expensive 3G/LTE connections.

4. There may be an Initial Coin (Token) Offering to finance a larger infrastructure to support a Third WAN source. The sponsor of that project could be us, our partner telco(s), the government, and other strategic investors. These investments in networking infrastructure would likely take the form of small cells, enterprise grade WiFi and long-range microwave. These types of Internet connection represent cheaper alternatives to mobile data, 3G/LTE.

The commercial success of our third WAN source may depend on our anchor telco partner agreeing to the terms of the smart contract, being part of the ecosystem from Day One. This is the case since >90% of Internet access by the (Philippine) population flow through the two major telcos, with majority of bandwidth running on 3G/LTE or mobile data.

We highlight the self-controlling mechanisms that would make the data token ecosystem viable. There are real savings derived by our telco partner in not having to spend more on cellular sites and other Internet infrastructure to cover the same number of people. They also save dramatically on installing cellular indoor equipment such as femtocells and small cells. They have an incentive to preserve the data token's value, in this case, if exchanged for their services, such as 3G/LTE connectivity or texts and voice minutes.

On the other hand, to lower the exchange rate of the token to LTE MB's unilaterally and with little consideration for market prices will result in fewer people agreeing to share scarce Internet with the telco's subscribers. Members will begin to distrust the system (that our telco partner will preserve the value of the data tokens). This is similar in many respects to why airlines seldom or if at all change the rate by which frequent flyer miles can be exchanged for actual flights and hotel stay.

Wireless Internet service providers, such as our community MyKapits™ WiFi, will also want to preserve the value of the data token, to the extent that we are able to source cheaper, more convenient un-metered than otherwise possible through our own efforts.

All about Incentives to Share Unmetered Internet when in Excess

The new Net Sharing and Token Ecosystem will be a boon to certain persons who, for example, will realize that they just so happen to have a location or they happen to be residing in an Internet strategic point, such as high places that have line of sight to other places with cheap fiber Internet. For these people currently, there is no incentive to build microwave even for themselves. They'd rather still just pay for 3G/LTE based Internet.

With the new net sharing scheme, wherein they can resell excess Internet connectivity beyond what they need, there is now a real incentive to act on that opportunity. Point to point microwave links, covering distances of >50 kms have dramatically dropped in cost. Now the same equipment can be readily purchased for less than $1 k versus ten times that just a few years ago.

Such behavior will only serve to bolster the entire ecosystem and more people will enjoy cheap and reliable Internet connections (a result of even more efficient distribution of paid Internet bandwidths).

Bandwidth Efficient Delivery of Video Content

A layperson's perception of Internet quality is primarily determined by how smooth—or buffer-free—he is able to watch Youtube, or any video material, for that matter. The other metric used to gauge quality is how reliable he can do voice calls OTT.

Inspired by the success of our MyKapits™ WiFi service, we use edge computing techniques for the delivery of video content.

Edge Cache-ing of Video Content. This time we place video material on NAS devices by the networks serving as Third WAN source. The greater the density of users served, and the more likely that particular types or genre of video material would be accessed, the closer we would cache these videos. We aim to lessen the number of hops from our NAS containing the videos to the end-users.

Edge Cache-ing at the Super WiFi LTE Router Level. There would be instances too, in which, we could serve videos, in peer-to-peer or bittorrent fashion, from the micro SD cards of the super WiFi LTE routers. Though SD cards have limited storage, in the case of high requested non-youtube video material, such as top "telenovela" TV series or major news, they could nonetheless improve video delivery quality and consequently decongest WAN traffic.

Peak/Off-peak Delivery of Video Content. Also, we plan to work with our telco partner in giving cheaper video data plans by enabling time-shifting in the downloading of the video material. For example, we can give our users the option of streaming a popular movie now or wait a bit later to watch the movie. We will choose a strategic time to start loading the movie on the micro SD cards or nearby NAS devices, when there's less Internet traffic.

Partnerships with Content Distributors and Owners. We envision partnerships with content owners or distributors, such as Youtube, Netflix, Hooq, local TV networks, and the like. This means more seamless content delivery even on encrypted (SSL) traffic.

Not Just for Videos. Any Heavy Content, Really. Those that Tend to be Accessed Regularly.

While we have for the most part explained matters in the context of delivery of video content, this is not necessarily limited to such. The methodology of efficiently or affordably delivering video content can also be applied to other data hungry content—such as music, podcasts, app and OS downloads/updates.

Focus ON UI/UX

Because of the highly efficient distribution of Internet bandwidth through our mesh network and the use of traffic shaping and Internet access control systems, and the real incentives to participate in net sharing, the general Internet experience of all subscribers to a particular mobile network will be greatly enhanced.

Topping Up Airtime Through a Host System (not Necessarily the SIM in the Router) and a Third Party "Counting" System of MB's Used But the design of our apparatus (e.g. router) itself represents significant improvement in user experience solving current customer pain points in terms of topping up prepaid wallets.

For example, the practice of topping up the prepaid LTE modems in the market today is clunky. Those existing LTE routers currently provided by Philippine telcos integrates a SIM of course that must be topped up for prepaid Internet access. The curious practice of many users is to keep an alternate SIM card to switch to when it is time to top up.

The direct top up of a SIM is so, simply because that was how most prepaid billing systems have been created and continue to operate. It was a design most appropriate for postpaid accounts, whereby a user upon signing up for a mobile, chooses a specific data/call/text plan. That mobile plan is changed infrequently and if the user does choose to modify, he must wait for the next billing cycle—a month typically.

As for the two-SIM phenomenon, again, that too has something to do with the postpaid-centric nature of legacy and even modern telco IN's (intelligent networks used also for billing).

These IN systems were not designed to tell in real-time or with any accuracy (to the minute or even on the hour) whether a subscriber has used up its allocation of say 100 MB or 1 GB. There is no need for that type of precision with monthly billed cell phone accounts.

Also, there is the practice of selling app connectivity, such as Facebook for a day, or Spotify that has a different volume cap apart from the aggregate Internet MB allocation. Now, for as long as there is any active data plan of any sort, for an app or a bunch of apps, then one would not be able to top up a prepaid account's Internet wallet. That, too, is an unfortunate situation caused by the retrofitting of postpaid billing systems to suit the granular, oftentimes confusing, re-packaging of today's prepaid data plans.

Our design solves these very pain points:
1. Our apparatus (e.g. Super LTE WiFi router) may be equipped with an LCD screen that does not only display pertinent information as to volume use or whether Internet is active, but also displays any instructions and passcodes needed to top up the router. Topping up can be accomplished separately on one's mobile device (see next section) via peer-to-peer transfer of credits, removing the need to physically remove the SIM card which results in big churn rates—caused by damaged SIMs and SIM trays—and really an overall, poor customer experience.
2. Otherwise, facilitating convenient top ups of the Super WiFi LTE routers without need to memorize phone numbers, complicated syntax, through more easily remembered 5-digit numbers, communicated back to our servers.
3. Enabling real-time counting of volume or time-based Internet allocations by abstracting the need for the telco's IN to do so. Again we note that in our setup, Internet consumed is either sourced from the account identified by a SIM inserted in a particular modem/router or from another modem/router through the Second WAN source. This introduces an added layer of billing complexity to the telco's IN (or billing system), which has been designed to count and charge for data that passes through a modem identified by a host SIM (certainly not via another SIM/modem setup via the mesh network of modem/routers). Instead, we simply tell the telco how much data was used up by users connected to a particular modem/router, regardless of where it got its Internet connection. (This is explained further in the section "our super WiFi LTE routers do the counting.")

Our Person-to-Person (Telco User Account-to-Another User Account Sponsored Top Up System)

We deviate from the conventional approach of counting data consumed and billing through one's prepaid account, represented by a SIM card. Our data plans may be specific to the users connected to particular routers, excluding Internet bandwidth shared through the mesh network. It would be too unwieldy for the telcos to redesign their billing system to make this distinction, since most telco billing systems revolve around prepaid accounts identified through SIMs. Ours, on the other hand, revolve around the routers, e.g., identified through a MAC address or IMEI.

Our Process for Topping Up works as follows:
1. A user triggers a top-up by either accessing an app, landing on a website, texting commands to a shortcode, or by calling a USSD number, e.g. *143#.
2. At predetermined intervals, say every three (3) minutes, the apparatus' (e.g., Super WiFi LTE router's) LCD displays a 5-digit code. Or whenever a button is pressed on the router, the LCD displays a 5-digit shortcode, good for ten (10) minutes. This identifies the router whose users are to be given Internet connection. (We note that the subject router itself can be sharing Internet connection with other users through different routers, whether or not the users connected to the subject router have access to the Internet via a data plan.)
3. By design, the 5-digit code is dynamic (versus permanently indexed to a specific router). Further the 5-digit code is time dependent, which allows us to identify a particular router with just those few digits. This is similar in nature to RSA secure key systems used by banking institutions. We also note that studies have shown that numbers not exceeding 5 or 6 digits in length are easily remembered without having to write it down on a piece of paper.
4. With an app or through a website, the owner of the subject router, enters the 5-digit code, selects a particular data plan, then enters a mobile account number; in this case, it is the mobile account of the user to be charged for the selected data plan. A text is then sent to that mobile number, asking if the person wishes to pay for the plan with his own prepaid or postpaid account. A reply of "YES," confirms the transaction. the plan is activated for the subject apparatus (e.g. Super WiFi LTE router).
5. As for triggering using text, the payor mobile account triggers by sending to a shortcode the following message: "<5-digit router code> <data plan ID>". He then gets back a text asking for confirmation. He replies "YES" and data plan is activated for the subject router.
6. Finally, for the USSD triggered service, the payor mobile account dials a USSD number using this format: *143#, <5-digit short code>. Our system answers back, saying that we understand that he is topping up a particular router, and asks him to choose from any of the following available data plans. Like with any USSD navigated service, the payor chooses a particular item on a menu and presses "send." The transaction is confirmed. The subject router is topped up, and the payor mobile account charged.

Our Super WIFI LTE Routers do the Counting!

For SIMs inserted in our apparatus (e.g. Super WiFi LTE routers), the apparatus themselves will do the counting, such as number of MB's consumed by users connected directly to that router versus the volume being shared through the mesh network, with other routers.

The function of counting MB's, distinguishing Internet consumed by users connected to a particular router versus another, is accomplished by an app running on a variation of the Openwrt operating system and with the hardware specified above. The Linux-based openwrt operating system was designed that way.

Routers do the counting and records are sent back to our central billing servers. Our centralized billing servers compile all these records and continuously communicate with the telco's IN, in a most direct fashion, via API's and the like.

A Special Iteration of Wi-Fi Offloading to Expand the Coverage of Cellular Base Stations and Thus Offer Better Indoor Coverage Commercial WiFi is typically provided by mobile network operators (or via their sub-contracted partners), by setting up WiFi hotspots in high traffic locations where they can offload the cheaper (fiber-based), stronger, and more sensitive WiFi Internet connections for mobile users while at the same time freeing up space in the scarce LTE "last mile."

This way subscribers enjoy a far better Internet experience, whereas as the LTE network gets filled up, they would have been downgraded to 3G or worse to a 2.5G mobile network.

Specially designed apparatus, as described herein (e.g., Super LTE WiFi routers) will actually act like hotspots ready to offload data connections on tap to mobile users who come near it, as they enter a building for example, where one of these routers are set up. The process by which WiFi offloading is accomplished without need for an expensive EA SIM infrastructure, the conventional means telcos unify the provision of Internet service to their subscribers who otherwise have active 3G/LTE data plans.

The difference of course is that this hotspot is no longer a telco/MNO set-up. The hotspot may be a WiFi access point installed (by us). Even better, the WiFi hotspot may in fact have been opened up by an ordinary subscriber who has set up our Super LTE WiFi router and signed up to share his Internet. He does so of course with a view to earn rewards/tokens even as he has played a part in democratizing access. As a matter of fact, the subscriber explicitly assigns a second SSID e.g., "GTEvery1sWiFi" visible to other people in the vicinity.

As again, for our telco partner, this arrangement results in less stress on its cellular networks, less stress on their indoor small cell/femtocells, even as a greater number of Non-LTE Non-700 MHz supported smartphones are able to tap "indirect" or "crowd-sourced" connections thereby benefiting from still more efficient distribution of LTE and the digital dividend 700 MHz.

We can apply iterations of how one's data plan is consumed or used up if connected via an apparatus (e.g., Super WiFi LTE router) on, e.g. WiFi, offload mode. It could be done on a one-to-one basis, meaning each MB used up is equivalent to an MB used through a direct 3G/LTE connection. Through some agreement with the telco, much less may also be charged if at all against the user's 3G/LTE volume allocation.

This feat however is not easily accommodated by today's IN systems; rather we rely on a similar router volume counting system described above.

Our Business (Revenue) Model

We intend to earn off "software" as opposed to "hardware" sales. It is a business model we've grown accustomed to, and we feel that lasting competitive advantages or barriers to entry can be strengthened over time.

We categorize the type of software revenue in the following manner, listing below the possible scenarios:

Direct Consumer Charge

Here we charge directly the consumer, likely through a credit card, online wallet, and similar. There's a premium charge for the unlocking of features such as time shifting of content downloads to "off-peak" times. Other features, unlock-able by paying a fee could be the ability to share and earn from providing a "Third WAN Source", the backup of media, photos and videos into the SD card or a cloud storage, secure Internet access via a VPN, downloading of apps to run on the router (antivirus, media server), factory-unlocking of the router to be able to work with other telcos, and similar.

We all get the point. Common among these are events that are actionable from a software point-of-view.

Revenue-Sharing Partnership with a Telco

This is a type of partnership in which all are very familiar. It involves the telco making a direct "line item" charge, also called "operator billing" on one's postpaid or prepaid account. Then we are given a share from 30% to 80% of the end-user charge.

Any of the features listed under "direct consumer charge" may also apply here. Though there is likely a higher penalty going through the telco, it is made up by the convenience it accords the consumer. This is especially true in prepaid markets, where customers do not have credit cards or access to forms of suitable payment, such as "paypal" and the like.

Beyond those chargeable events in the "direct consumer charge" section, here we go with even more granular, and bite-size, lower denominations. These events, unlike feature unlocks, tend to be more regular, recurring:

Pay-per-view of movies, tv shows, shorts—otherwise known as (VoD or video-on-demand) are likely to go through our edge-cache-ing system Time-shifting, pre-selection of movies and shows, (similar to TIVO-ing) for later viewing—where we shift the streaming and download to a non-peak time and when it is more convenient for the user to watch Cache-ing of HD music/playlist/Internet radio-type on the SD card or nearby NAS device for time-bound listening A share for every top-up transaction that uses our proprietary user-friendly system A commission from the income in extending credit to the customer, for data plan purchases, premium videos, and even the financing of the purchase of the Super WiFi LTE modem Revenue-sharing Partnership with Content owners and Distributors Content distributors, the likes of Netflix, Hulu, local players such as iFlix, Hooq, and content owners, like TV Telenovela series king ABS-CBN, would see the value of being able to deliver their content by the "edge" i.e., micro SD cards, NAS devices nearby.

In developing markets, such as the Philippines, where expensive mobile data access is the predominant means of connecting to the Internet, the cost of access trumps that of content subscriptions say a monthly Netflix charge. Take the USD1.00 1 Gigabyte plan. That is only good for one, if at all, SD netflix movie.

The ability of our Super WiFi LTE devices to shape traffic, put content on the edge for time-shift consumption or simply to lessen the demands on WAN bandwidth, allows us and our telco partner to price access competitively.

We intend to charge content owners and distributors a fee for making their services more accessible and affordable. The arrangement could be on a per charge basis, whether monthly or some pay-per-view type setup.

Further, our Super WiFi LTE is configured for the delivery of content via IPTV protocols and standards. In addition to video-on-demand (unicast) as above, this also covers Live TV or streaming (multicast). This, however, can only be made available to customers when a Third WAN source, unmetered Internet connect is present in a mesh network. IPTV accessed purely via 3G/LTE would otherwise be too expensive.

We plan to charge content partners, owners, and distributors, for the delivery of VoD and live streaming content through our Super WiFi LTE mesh network.

Enterprise Installation in High Rises without Need for Structured Cabling

Multi-level (>8 floors) residential and commercial buildings in this part of the world (e.g., the Philippines) rarely have structured cabling (for data, CAT5/CAT6). In fact, less than half of residentials have provisions for telephone "copper", a prerequisite for the common DSL.

With cell site antennas invariably tilted downwards, getting good mobile signal above "floor 8" is a challenge for most. To improve connection, many opt to install directional antennas for their 3G/LTE modems by their windows pointed downwards at the telco's cell sites.

Our invention overcomes these obstacles by allowing our mesh network to operate using powerful sub-giga wireless connections that cut through building walls and floors.

In one setup, our partner telco may choose to install enterprise-grade powerful LTE modems at a strategic location of the building, likely at a middle section of the building, with an external antenna facing nearby cell sites (cf., apparatus 510 of FIG. 5). Its primary purpose is to spread Internet connectivity through the Super WiFi LTE routers (e.g. apparatus 520 and 530) in the building through the mesh network. This serves as a more affordable, more easily configured alternative to laying down structured cabling or installing femtocells, microcells, and similar.

The invention claimed is:

1. An apparatus comprising:
a first communication module operable to obtain network access via a first wireless path using a first radio access technology, wherein the first radio access technology is a cellular technology;
a second communication module operable to communicate, via a second radio access technology, with at least one disparate apparatus that is operable to obtain network access via a second wireless path; and
a control unit operable to:
determine whether to provide the network access via the first and/or via the second wireless path to at least one user terminal via the second radio access technology based on a network traffic of at least one of the first wireless path and the second wireless path; and
alter a frequency channel and/or a transmission power used by the second communication module at least in part based on an interference level caused by licensed and/or unlicensed use of the frequency channel;
wherein the apparatus is configured to provide a compensation, in particular a digital currency, credit and/or token, to the disparate apparatus, if network access is provided via the second wireless path.

2. The apparatus according to claim 1, wherein the first radio access technology is one of: 3G, LTE and/or advanced LTE and/or 5G.

3. The apparatus according to claim 1, wherein the second radio access technology is WiFi and/or uses one or more sub-GHz bands.

4. The apparatus according to claim 1, wherein the control unit is further operable to allocate a first data rate and a second data rate, and/or a first bandwidth and a second bandwidth to the at least one user terminal for network access via the first and second wireless path, respectively.

5. The apparatus according to claim 4, wherein the control unit is adapted to allocate the first and second data rates, and/or the first and second bandwidths, at least in part based on the first radio access technology and/or a second radio access technology available on the second wireless path and/or a congestion level of the first path via the first radio access technology and/or a congestion level of the second path via the second radio access technology.

6. The apparatus according to claim 4, wherein the control unit is adapted to allocate the first and second data rates, and/or the first and second bandwidths, at least in part based on a data rate and/or a bandwidth requested by the at least one user terminal.

7. The apparatus according to claim 1, wherein the providing the network access via the first and/or via second wireless paths includes load balancing on the network layer.

8. The apparatus according to claim 1, wherein the apparatus is adapted to form a mesh network with the at least one disparate apparatus.

9. The apparatus according to claim 1, wherein the apparatus is adapted to retrieve data requested by the at least one user terminal from the mesh network.

10. The apparatus according to claim 1, wherein the apparatus is adapted to retrieve data requested by the at least one user terminal from a cache of the apparatus and/or a cache of the at least one disparate apparatus.

11. The apparatus of claim 1, wherein the compensation is selected at least in part based on a property of the network access via the second wireless path, in particular a time, a period and/or a data rate of the network access.

12. The apparatus of claim 1, comprising a third module operable to provide network access via a broadband access technology.

13. The apparatus of claim 4, wherein the control unit is adapted to track the amount of data sourced from the network access via the first and/or via the second wireless path on a per user terminal basis.

14. An apparatus comprising:
a first communication module operable to obtain network access via a first wireless path using a first radio access technology, wherein the first radio access technology is a cellular technology;
a second communication module operable to provide the network access to at least one user terminal via a second radio access technology;
wherein the second communication module operable to communicate, via the second radio access technology, with at least one disparate apparatus;
wherein the second communication module is operable to provide the network access to the disparate apparatus via the first wireless path; and
a control unit operable to alter a frequency channel and/or a transmission power used by the second communication module at least in part based on an interference level caused by licensed and/or unlicensed use of the frequency channel;
wherein the apparatus is configured to provide a compensation, in particular a digital currency, credit and/or token, to the disparate apparatus, if network access is provided via the second wireless path.

15. The apparatus according to claim 14, wherein the first radio access technology is one of: 3G, LTE and/or advanced LTE and/or 5G.

16. The apparatus according to claim 14, wherein the second radio access technology is WiFi and/or uses one or more sub-GHz bands.

17. The apparatus according to claim 14, further comprising a control unit operable to allocate a data rate and/or a bandwidth for network access by the disparate apparatus.

18. The apparatus according to claim 17, wherein the control unit is adapted to allocate the data rate, and/or the bandwidth, at least in part based on the first radio access technology and/or a congestion level of the first path via the first radio access technology.

19. The apparatus according to claim 17, wherein the control unit is adapted to allocate the data rate, and/or the bandwidth, at least in part based on a data rate and/or a bandwidth requested by the disparate apparatus.

20. The apparatus according to claim 14, wherein the providing the network access includes load balancing on the network layer.

21. The apparatus according to claim 14, wherein the compensation is selected at least in part based on a property of the network access via the second wireless path, in particular a time, a period and/or a data rate of the network access.

22. A system comprising at least one apparatus, each of the at least one apparatus comprising:
a first communication module operable to obtain network access via a first wireless path using a first radio access technology, wherein the first radio access technology is a cellular technology;
a second communication module operable to communicate, via a second radio access technology, with at least one disparate apparatus that is operable to obtain network access via a second wireless path; and
a control unit operable to:
determine whether to provide the network access via the first and/or via the second wireless path to at least one user terminal via the second radio access technology based on a network traffic of at least one of the first wireless path and the second wireless path; and
alter a frequency channel and/or a transmission power used by the second communication module at least in part based on an interference level caused by licensed and/or unlicensed use of the frequency channel;
wherein the system is configured to provide a compensation, in particular a digital currency, credit and/or token, to the disparate apparatus, if network access is provided via the second wireless path.

23. The system according to claim 22, wherein the at least one apparatus is installed in a building, in particular at one or more floor levels six or higher.

24. A method comprising:
receiving, at an apparatus, a request for network access from one or more user terminals using a second radio access technology;
determining, by the apparatus, to provide a first portion of the network access by using a first wireless path, from the apparatus to a radio access network, using a first radio access technology, wherein the first radio access technology is a cellular technology;
determining, by the apparatus, to provide a second portion of the network access by using a second wireless path, from the apparatus to a disparate apparatus, using the second radio access technology;
wherein determining to provide the first portion of the network access and to provide the second portion of the network access is based on a network traffic of at least one of the first wireless path and the second wireless path;
wherein the apparatus includes a control unit operable to alter a frequency channel and/or a transmission power used for the second wireless path at least in part based on an interference level caused by licensed and/or unlicensed use of the frequency channel;
wherein the apparatus is configured to provide a compensation, in particular a digital currency, credit and/or token, to the disparate apparatus, if network access is provided via the second wireless path.

25. A method for providing network access to one or more user terminals in a building, the method comprising
installing at least one apparatus,
in particular at one or more floor levels six or higher, wherein each of the at least one apparatus comprises:
a first communication module operable to obtain network access via a first wireless path using a first radio access technology, wherein the first radio access technology is a cellular technology;
a second communication module operable to communicate, via a second radio access technology, with at least one disparate apparatus that is operable to obtain network access via a second wireless path; and
a control unit operable to-determine whether to provide the network access via the first and/or via the second wireless path to at least one user terminal via the second radio access technology based on a network traffic of at least one of the first wireless path and the second wireless path; and
alter a frequency channel and/or a transmission power used by the second communication module at least in part based on an interference level caused by licensed and/or unlicensed use of the frequency channel;
wherein the method is configured to provide a compensation, in particular a digital currency, credit and/or token, to the disparate apparatus, if network access is provided via the second wireless path.

* * * * *